(12) United States Patent
Fager et al.

(10) Patent No.: US 7,236,880 B2
(45) Date of Patent: *Jun. 26, 2007

(54) METHOD FOR DETERMINING THE POSITION AND/OR ORIENTATION OF A CREATURE RELATIVE TO AN ENVIRONMENT

(76) Inventors: Jan G. Fager, Fagelpilsgatan 6, Vasteras (SE) S-723 53; Klas Jacobson, Infanterigatan 134, Vasteras (SE) S-723 50; Monica Schofield, Am Hohenkamp 57, Bad Oldersloe (DE) 23843

( * ) Notice: Subject to any disclaimer, the term of this patent is extended or adjusted under 35 U.S.C. 154(b) by 45 days.

This patent is subject to a terminal disclaimer.

(21) Appl. No.: 10/714,896

(22) Filed: Nov. 18, 2003

(65) Prior Publication Data

US 2004/0148125 A1    Jul. 29, 2004

Related U.S. Application Data

(63) Continuation of application No. PCT/SE02/00968, filed on May 21, 2002.

(30) Foreign Application Priority Data

May 18, 2001    (SE)    .................................... 0101807

(51) Int. Cl.
    *G01C 9/00*    (2006.01)
(52) U.S. Cl. ...................... 701/209; 702/150
(58) Field of Classification Search .......... 340/825.49, 340/993
    See application file for complete search history.

(56) References Cited

U.S. PATENT DOCUMENTS

| 3,696,384 | A | * | 10/1972 | Lester ......................... 367/199 |
| 4,698,781 | A | | 10/1987 | Cockrell, Jr. |
| 5,781,150 | A | | 7/1998 | Norris |
| 6,138,073 | A | | 10/2000 | Uchigaki |
| 6,396,413 | B2 | * | 5/2002 | Hines et al. ............ 340/825.49 |
| 6,665,631 | B2 | * | 12/2003 | Steinbrecher ............... 702/159 |
| 7,061,429 | B2 | * | 6/2006 | Fager et al. ................ 342/464 |

FOREIGN PATENT DOCUMENTS

| DE | 196 11 757 | 5/1997 |
| DE | 197 11 087 | 9/1998 |
| DE | 199 21 759 | 11/2000 |
| EP | 0 795 960 | 9/1997 |
| GB | 2 326 550 | 12/1998 |
| WO | 96/35960 | 11/1996 |

* cited by examiner

*Primary Examiner*—Thu V. Nguyen

(57) ABSTRACT

A method for determining the position and/or orientation of a creature (3) relative to an environment by connecting the creature (3) to a locating member (4) including a transducer (5) so that the relative positions and/or orientations of the creature (3) and the transducer (5) are arranged to be within a limited interval. The transducer determines its position and/or orientation relative to the environment by receiving incident signals from the signal sources (9) in the environment, and the position and/or orientation of the creature (3) is determined by the position and/or orientation determined for the transducer (5).

49 Claims, 9 Drawing Sheets

METHOD FOR DETERMINING THE POSITION AND/OR ORIENTATION OF A CREATURE RELATIVE TO AN ENVIRONMENT

CROSS REFERENCE TO RELATED APPLICATIONS

This is a Continuation of International Application PCT/SE02/00968 filed on 21 May 2002, which designated the United States of America.

FIELD OF THE INVENTION

The present invention relates to a method for determining the position and/or orientation of a creature relative to an environment, a method for locating a phenomenon in an environment, a method for determining if the position and/or orientation of a phenomenon relative to an environment is in accordance with a reference, and a method for determining if the position and/or orientation of an object relative to an environment by means of a creature.

Such methods may be used for a number of purposes, but hereinafter the particular, but not in any way limiting for the invention, fields of application constituting a means for guiding and supervision of a creature, and for scanning, guarding or checking an object, an area or a volume by means of a creature will be described.

Initially, a number of terms used in the present application will be explained and defined more closely below. In this connection, it is emphasised that the terms "creature", "object", "phenomenon", "environment", "indoors", "semi-indoors", "model", "position", "orientation", "authorization", and "abstract stations" occurring in the text are to be given very broad meanings in accordance with the following definitions.

The term "creature" includes human beings and animals. Although, animals belonging to the group of mammal are intended in the first place, also other animals such as birds, fishes, batrachians and reptiles, and insects are included.

By the term "object" both physical things and creatures or parts thereof are intended.

In addition to creature and things the term "phenomenon" comprises also steam, liquids, shadows, lights, sources of a sound, waves, vibrations, motions, propagating cracks, draught, flows, vortexes, turbulence, discolorations and tints, and other comparable phenomena.

An "environment" may be constituted by one or more physical things or parts thereof, and/or creatures, as well as by an arbitrary volume with or without physical limiting surfaces. The volume or the space may include one or more solid objects and/or contain different mediums in a gas state and/or a liquid state. It is also possible that there is vacuum in the volume. In the environment both stationary and movable objects/phenomena may occur. The current environment may be located both outdoors and indoors and possess a great or small extension compared to the creature.

The present invention is intended to by applied primarily "indoors" and "semi-indoors". The term indoors includes all types of locations inside different kind of permanent or temporary buildings and constructions, or naturally occurring enclosings, such as dwelling houses, factory premises, offices, tents, caves, tunnels, mines, but also simpler constructions in which there are walls, pillars, and/or masts which support some kind of roof. The roofs may cover the current area totally or be designed as a net, lattice or battens. Also places inside different kind of crafts, such as vessels, trains, cars, aeroplanes and spacecrafts are counted among the category indoor environments. In the term semi-indoors places located outdoors in the vicinity of constructions or naturally occurring objects and close to the outer limitations of the indoor environments, such as in the vicinity of roads, roofs, masts, pillars, power lines, towers, walls, lamp-posts, bridges, trees, rock formations, stones, bushes, long valleys and hills, puddles, shorelines, variations in vegetation, etc., are intended.

It should also be emphasised that the term "model" is intended to comprise everything from very simple models of environments, such as few co-ordinated data, graphs, drawings, maps, etc., to more advanced two-, three- or higher dimensional models, which may be moved, rotated, changed or processed in any other way, for example in a computer graphic environment for picture processing and/or evaluation, and also the most advanced models as regards interactive application, the so called virtual reality (VR) models, in which a user in a virtual way may take part of the properties of an environment. Furthermore, the models may include photographic still pictures and moving pictures in the form of film sequences. In a model vectorial quantities, such as a gas flow, may be illustrated by means of arrows in such a way that the direction and length of an arrow denote the direction and the value, respectively of the present quantity. Furthermore, other quantities, which very often are non-anisotropic quantities, such as temperatures, radiation intensities, etc., may be illustrated in the form of differently coloured transparent surfaces representing surfaces in a volume along with surfaces a current quantity has for example a constant value. In addition, holographic reproductions and models of abstract and mathematical character are also included, such as those which depict an environment by means of for example reciprocal spaces.

Furthermore, the terms "position" and "orientation" have the following meanings. A three-dimensional object, i.e. a physical article or a creature, may have up to six spatial degrees of freedom, three translations and three rotations. The "position" of the object is defined by the three quantities which denote translations in relation to the origo of a current coordinate system. These are denoted in this application by x, y and z. However, it is also possible to denote the position parameters in other coordinate system, for example in polar coordinates, $(r, \phi, \phi)$. The "orientation" of the object is defined by the three quantities which denote the angles of rotation of the object in the coordinate system. These are denoted in this application by $\alpha$, $\beta$ and $\gamma$.

In practice, an object often has a number of degrees of freedom which is less than six. A cursor on a computer display, for instance, usually has two degrees of freedom. Its orientation is constant (or irrelevant), and its position is characterized by two variables. Similarly, a three-dimensional object may have such limitations that it has fewer than six degrees of freedom. For example, a block movable on a table has three degrees of freedom—two variables indicates its position on the table top and one variable its orientation, i.e. its angle of rotation about an axis perpendicular to the table top.

"Authorization" means that a creature has admittance, or has not admittance, to a certain area/volume in an environment or to an object or is permitted, or is not permitted, to perform a certain action. For this authorization it may also be special conditions to be fulfilled, such as a certain point of time or a predefined action which has to be performed by the creature or by any other, or that a special state is present in the environment or that a certain occurrence has occurred or occurs.

"Abstract stations" is selected sets of positions and/or orientations in the environments which not necessarily need to coincide with the position or extension of a physical thing, but an abstract station may be defined by one or more selected position- and/or orientation parameters depending on, or independent of, the properties of the environment, and possibly by a specific time interval.

Furthermore, it should be pointed out that although application examples are initially described below in which the relative movement between the device used for accomplishing the methods, or at least parts of the device, and the environment, is performed by moving the device itself, it is in some cases possible to use a stationary device and instead accomplish the relative movement by moving the environment, for example in the cases in which the environment is constituted by an object which is not stationary installed.

PRIOR ART

Within a number of different fields there is a need to locate a phenomenon in an environment or to locate a creature, often a human being, or an object connected to the creature, as regards its position and/or orientation relative to a previous position and/or orientation or relative to an environment. The object may be for example a craft of some kind in which the creature is present or an object in the environment, the position and/or orientation of which is desired to be controlled by means of the creature.

For example within the field of guarding, there is a need to check and/or supervise the movements of a guard and other possible actions performed by the guard at moments when the guard patrols a so-called guard path, for example in a building. In accordance with prior art, this is performed by the fact that the guard is imposed to perform an action at certain predetermined locations (control stations) along the guard path, such as turning a key, with the use of short distance transponders or plates readable by remote sensing or mechanical contact, or performing a reading of a bar code, which confirms that the current guard has been at the current place at a certain moment. This is used to obtain information about whether the guard has or has not executed his instructions during the current guard path. In addition, by ocular inspection, the guard may establish to some extent if objects in the environment are correctly positioned or if unauthorized persons are present in the building and if so is desired, he may transfer this information to someone else, for example to a guard officer, the police etc.

As a complement to the observations of the creature, many different types of sensors may be used for indicating different states in the environment. To indicate that a window has been crushed, a glass-crushing detector may be used and by means of an alarm device arranged at the window, information may be obtained, for example about that the window is open although it should be closed.

However, the procedure described above has several disadvantages. These are foremost associated with the lack of flexibility. The guard path is determined beforehand with small possibilities of changing the path when it has already begun. It is true that it is possible to vary the sequence of the control stations which are to be visited, but the number of different movement paths is still limited. Furthermore, the possibility to supervise the guard is very restricted and, actually, only knowledge about if the actions mentioned above are performed or not and about in which order and/or at which points of time these actions possibly have been performed, is obtained. However, any information about the path of movement of the guard or where the guard is present between the control stations is not obtained other than indirectly in the cases there is knowledge about by which speed the guard moves and about the time difference between actions performed at different control stations. In addition, many and stationary installations of control stations are often needed to enable guard paths of the kind discussed herein and if objects in the environment are to be checked in another way than by the guards' observations, large installations of different kinds of sensors and/or cameras throughout the environment are needed. In addition, there is no way besides the guards' observations to locate a phenomenon which occurs in an unexpected place, at which there is no sensor placed out. Such a phenomenon may be a machine breakdown, a leakage of a pipe, an object, etc., which is present/is not present. It is true that there is a possibility to use sensors and/or cameras which cover a relatively great area, but then such an indication is often associated to a comparatively great inaccuracy as regards the position of the phenomenon. For example, with a sensor located at the floor level in a room, it may be determined if there is a leakage in a water pipe occurring in the room, but it is not possible to determine where in the room the pipe having a leakage is located or where on the pipe the leakage has arisen.

Another field related to the field of guarding is supervision of people serving a sentence because they have committed a crime. In this connection, it may come into question to supervise a person who is in prison as well as a person who serves a sentence in another environment in the community. It becomes more common, particularly as regards lighter offences, that a person who is found guilty of a crime under certain given conditions is offered the alternative to serve the sentence in another environment, for example at home, different from the conventional prison environment. Usually, in such a case, certain restrictions as regards the freedom of movement are imposed upon the punished person, i.e. he/she has permission to be only within certain given areas during certain given time intervals. This means that in practice, the person often must stay only in his/her own house. Exceptions may be made during a certain time, for example to enable the person in question to perform work in another location. Furthermore, as a service in return, the person has to carry a so-called electronic tag with the purpose of continuously determining the position of the person, so that it may be checked that the person does not exceed the restrictions which are present. According to already established technique, the supervision is performed by that the electronic tag attached to the person substantially continuously transmits signals to a receiver in the environment, so that any movements of the person may be recorded. A great disadvantage with this technique is that the signals transmitted may be bugged also by non-authorized persons and be used for tracking the person who carries the tag. Thus, it is possible that people who for example may constitute a safety threat against the person in question could obtain information about where the person is present by intercepting the signals by means of a receiver.

A further field where a need to locate a phenomenon in an environment or locate a creature, often a human being, or an object connected to the creature, as regards its position and/or orientation relative to a previous position and/or orientation or relative to an environment, is present in guidance and/or guiding people, for example in connection with exhibitions, visits in shops, stores, shopping centres, museums and hospitals or at railway stations and air terminals, etc. The technique used nowadays is in most cases communication of information to the current person via signs and displays located in the environment or via portable written information, such as maps and other documents. However, in this case the possibility to give adequate information based on the position and/or orientation of the person, with the purpose of guiding the person, is missing, with the exception of particular information stations, which have a map by which the person may determine its approximate position relative to the environment and receive information about for example the choice of way to be able to move to a certain place in the best way. However, this procedure is static and does not offer the possibility to interact to the extent which often is desired to satisfy the desires of the person.

THE OBJECT OF THE INVENTION AND SUMMARY OF THE INVENTION

A first object of the present invention is to provide a method for determining the position and/or orientation of a creature relative to an environment, which method may be applied both indoors and semi-indoors, and without the creature having to seek up a certain place for enabling the position- and/or orientation determination, and in a way that the risk for non-authorized tracking of the creature is substantially reduced.

This object is attained according to the invention by a method for determining the position and/or orientation of a creature relative to the environment, comprising that the creature is connected to a locating member including a transducer, so that the relative positions and/or orientations of the creature and the transducer are arranged to be within a limited interval, the transducer determining its position and/or orientation relative to the environment by receiving incident signals from signal sources in the environment, and that the position and/or orientation of the creature is determined by means of the position and/or orientation determined for the transducer. Such a method may be used in all environments where the required signal sources have been arranged or are present in the form of naturally occurring objects. Furthermore, the position and/or orientation determination may be performed for any position/orientation on condition that the transducer receives the required signals from the signal sources. By the fact that the transducer determines its position and/or orientation by means of signals which incident on the transducer, the risk of non-authorized tracking of the creature is minimized.

According to another preferred embodiment of the method according to the invention for determining the position and/or orientation of a creature relative to an environment, the position and/or orientation of the creature is repeatedly determined when the creature moves, by that the transducer repeatedly determines its position and/or orientation by receiving incident signals from signal sources in the environment. By such a method, the positions and/or orientations determined for the creature may be recorded for mapping of the movement of the creature relative to the environment and/or the relative movement, i.e. movement relative to the previous position and/or orientation of the creature.

A second object of the present invention is to provide a method for locating a phenomenon in an environment, which method reduces the disadvantages associated with such already known methods to a substantial extent, i.e. to provide a method which enables the locating of different types of each phenomenon without any need of an installation of a certain kind of sensor for phenomena and/or of cameras, and which method is able to locate phenomena and also such unexpected phenomena with great accuracy as regards the position and/or orientation of the phenomena.

This object is attained according to the invention by a method for locating a phenomenon in an environment, comprising that a creature is connected to a locating member including a transducer connected to a component intended for pointing out phenomena in the environment, that the pointing component is directed by the creature towards the phenomenon from at least one pointing position, the transducer determining its position and/or orientation by receiving incident signals from signal sources in the environment and thereby determining the position and/or orientation of the pointing component relative to the environment for said at least one pointing position, and that the position and/or orientation of the pointed-out phenomenon relative to the environment is determined by means of the position and/or orientation determined for the pointing component. By such a method, and if necessary use of further information about the nature of the environment in the form of for example a model, it is possible to determine the position and/or orientation of said phenomenon relative to the environment with great accuracy. Furthermore, it is possible to determine that the creature has or has had a certain position and/or orientation relative to said phenomenon. The pointing component may for example be provided with equipment for transmitting a laser beam and thereby the pointing component may be directed towards the current phenomenon with great accuracy. Thus, information about the position and/or orientation of the phenomenon may be obtained with great accuracy, which is of great value in many applications such as for example when the state of a certain equipment in the environment is detected. For example, determining where a damage of a machine is present, a leaking water pipe, a fire etc. By the method for example a leakage of a roof may be pointed out in a repeatable way, which means that the position for the defect of the roof which caused the leakage may be pointed out, and/or drawn on for example a CAD-drawing, when dropping from the ceiling, rainwater for instance, is noticed and then at a later moment when the dropping is not present, or when dropping from several other positions are present, the position of the defect may be pointed out again by means of the pointing component and the information from the occasion when the dropping was pointed out in the first place.

A third object of the present invention is to provide a method by which it is possible to use abstract stations as control stations for verifying that a phenomenon is present or has been present in a certain position and/or orientation at a certain point of time.

This object is attained according to the invention by a method for determining if the position and/or orientation of a phenomenon relative to the environment is in accordance with a reference, comprising that a creature is connected to a locating member including a transducer so that the relative positions and/or orientations of the creature and the transducer are arranged to be within a limited interval, that the reference is defined by the introduction of at least one condition regarding the position and/or orientation of the locating member relative to the environment, that the position and/or orientation of the locating member relative to the environment is determined by means of the transducer by receiving incident signals from signal sources in the environment, and that the position and/or orientation determined for the locating member is compared with a reference so that at least some possibly occurring state in which said at least one condition is fulfilled may be recorded. By such a method it is possible to easily and rationally define a lot of different paths which can not be predicted and which may be created in a random way or in a way chosen according to the present needs.

According to a preferred embodiment of the method according to the invention for determining if the position and/or orientation of a phenomenon relative to the environment is in accordance with a reference, the locating member is put by the creature into mechanical contact with an object in the environment for fixing the locating member or a part thereof, and thereby the transducer, relative to the object so that said at least one condition is fulfilled. By such a method, it is possible to determine for example that a window is closed, that a door is open or that a handle is in a certain position by the fact that the creature places a locating member so that the transducer is fixed relative to the object, the position of which is to be determined. In this connection, by means of the transducer, it may be determined where the locating member is present, and thereby where the creature is present, relative to the environment, for example, where in a room, so that it is secured that the right object is checked, and determined if for example the position and/or orientation of an object relative to the environment corresponds with the intended position and/or orientation or not.

The fourth object of the present invention is to provide a method for determining and/or adjusting the position and/or orientation of an object relative to an environment.

This object is attained according to the invention by a method for determining the position and/or orientation of an object relative to an environment by means of a creature, comprising that the creature is connected to a locating member including a transducer, that the locating member is put by the creature into mechanical contact with the object, that the position and/or orientation of the locating member relative to the environment is determined by means of the transducer by receiving incident signals from signal sources in the environment, and that the position and/or orientation of the object is determined by means of the position and/or orientation determined for the locating member. By such a method it is possible to for example determine the position of an object or perform adjustment and/or calibration of the object.

Further advantages and advantageous features of the invention are disclosed in the following description and remaining dependent claims.

BRIEF DESCRIPTION OF THE DRAWINGS

Preferred embodiments of the invention are described below by way of example only, and with reference to the attached drawings.

In the drawings.

DETAILED DESCRIPTION OF PREFERRED EMBODIMENTS OF THE INVENTION

Figure 1:
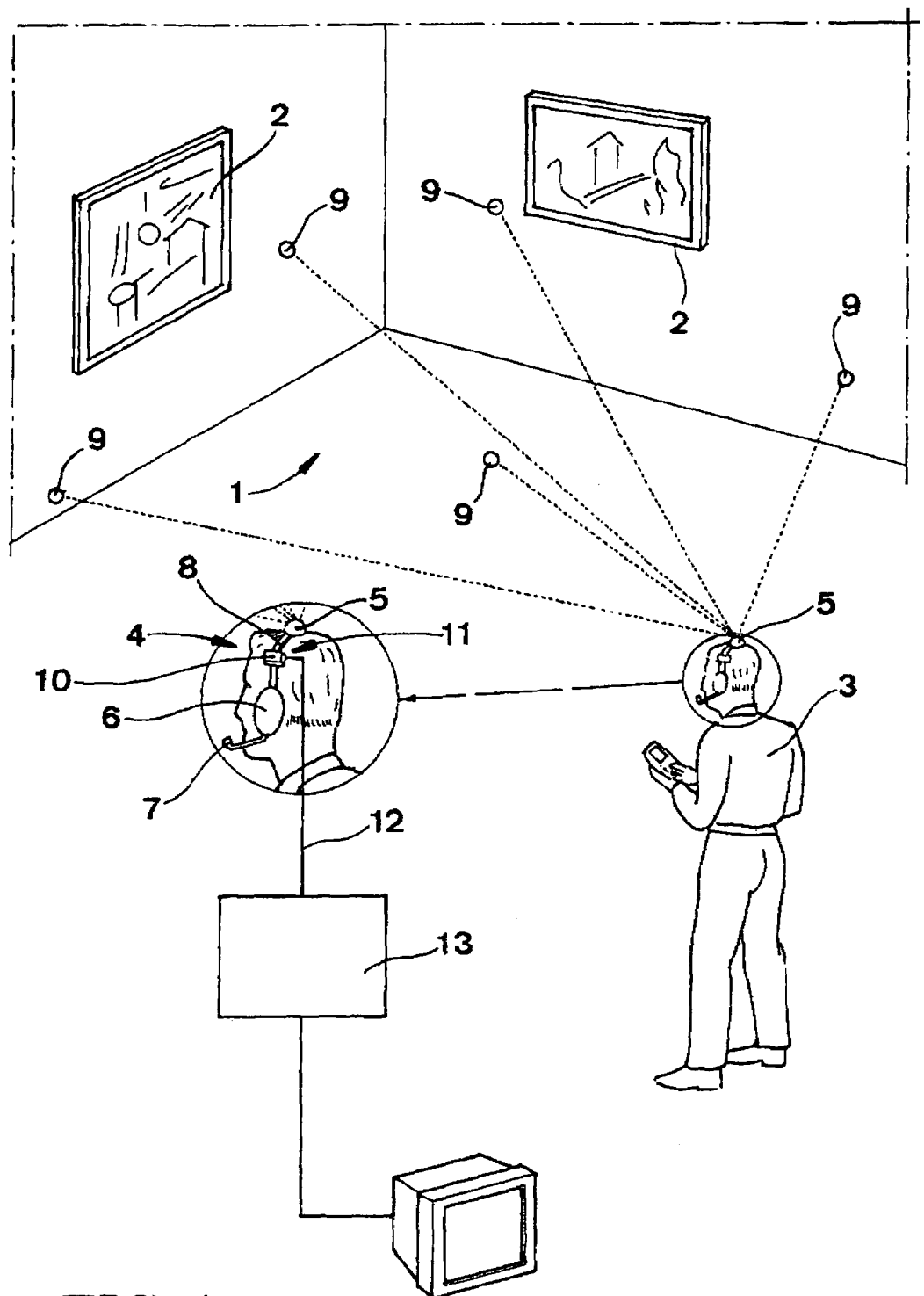
FIG. 1 is a perspective view of an environment in the shape of a room in a museum including a number of pictures and a visitor of the room.

The locating member referred to in this application may in its simplest design be constituted by a transducer for receiving signals incident from signal sources in the environment and a means for connecting the transducer and a creature to each other.

The connecting means may be for example, a glue, or a bag for carrying the transducer or a band accommodating the transducer which band is intended to be applied on the creature, such as a collar, bracelet or the like. However, it should be emphasised that the connecting means may be included in the transducer itself and be provided by the design of the transducer without using any component in addition to the transducer. As an example, the transducer may be provided with a connecting means in the form of a "handle" so that the transducer may be connected to the creature for example by the fact that the creature quite simply grasps or bites the transducer. The transducer may also be designed to be implanted in the creature.

Another type of connecting means is different kind of vehicles. In this connection, the creature and the vehicle are arranged so that the relative positions and/or orientations of the creature and the vehicle are arranged to be within a limited interval by the fact that the extension of the vehicle is limited or by the fact that the creature is fixed to the vehicle. The transducer may be arranged on for example a car in which the creature is present or on a boat on which the creature is present.

It should also be emphasised that the term environment defined in the introduction in its simplest embodiment may comprise only the signal sources from which the transducer is intended to receive signals for the position- and/or orientation determination, which will be described further below.

Even if it is not described in detail for all embodiments, it is pointed out that for all applications and embodiments described herein, signal sources in the environment is used for transmitting, reflecting or spreading signals which signals are received by a transducer with the purpose of determining of the position and/or orientation of the transducer. Furthermore, throughout the description, similar reference numerals denote same or analogous objects.

To avoid misinterpretations it is emphasised that the meaning of the term "to locate" a phenomenon or the like is in the first place to determine the position and/or orientation of the phenomenon relative to the environment or to trace the phenomenon in the environment, although if the invention also may be used to locate, in the meaning of put into a position, a phenomenon in a certain position and/or orientation relative to the environment.

In FIG. 1 an environment, which is constituted by a room 1, some of the limiting surfaces of the room 1 and a number of things 2 present in the room 1, is illustrated. Although, in this case, the environment is a schematically depicted room 1 in a building, in practice, the environment may be any indoor- or semi-indoor environment having several properties. In this embodiment, the environment is thought to be a museum room 1 and the things occurring in the room 1 pictures 2. A visitor 3 of the museum is present in the room 1. According to the invention, the visitor 3 is provided with a device for determining its position and/or orientation relative to the environment. The device comprises a locating member 4 connected to the creature 3 which locating member includes a transducer 5 arranged to determine its position and/or orientation relative to the environment. The transducer 5 included in the locating member 4 is arranged on the head of the visitor 3.

In this connection, it is interesting to determine the position of the person 3 relative to the room 1 as well as relative to separate objects 2 in the room 1. In addition, the transducer 5 enables determining of the orientation of the person 3. By the transducer 5 located on the head of the person 3, besides the position information, also information about how the head is turned relative to the environment, is obtained, which indirectly gives information about the viewing direction of the person 3.

In addition to the transducer 5, the locating member 4 includes earphones 6 and a microphone 7. Preferably, the transducer 5, the earphones 6 and the microphone 7 are arranged in a so-called headset to enable the user to utilise the equipment in a comfortable way. Thus, the headset mentioned above constitutes a means 8 by which the person 3 and the transducer 5 are connected so that the relative positions and orientations of the person 3 and the transducer 5 are arranged to be within a limited interval. Thus, by means of the information about the position and/or orientation of the transducer 5, the position and/or orientation of the person 3 may be determined.

Furthermore, the transducer 5 is arranged to receive incident signals from signal sources 9 in the environment, which signals propagate rectilinearly between the signal sources 9 and the transducer 5, for achieving the position or orientation information and the transducer 5 is arranged to repeatedly determine its position and/or orientation relative to the environment when the transducer 5 and the environment are moved relative to each other, i.e. when the person 3 moves. Furthermore, the transducer 5 is arranged to be freely movable and mechanically unguided by the environment in an arbitrary coordinate system by the carrier of the transducer.

With the expression that the position of a thing or of a creature is determined in this application is intended that at least some of the position parameters (x, y, z) is known in a coordinate system, the relation to the environment of which is known. By the expression that the orientation of a thing or of a creature is determined in this application is intended that at least one of the orientation parameters ($\alpha$, $\beta$, $\gamma$) is known in a coordinate system, the relation to the environment of which is known. Depending on the current application of the invention by the expression the position and/or orientation of the creature in some cases is intended the position and/or orientation of the creature in its entirety and in some cases the position and/or orientation of a particular part of the body of the creature. In one application, it may be sufficient to know for example where a human being is present and in another application information about for example how the head or the hand of a human being is turned relative to the environment or, particularly, relative to the rest of the body may be required. The number of transducers/locating members and their position on the creature depends on these desires to a great extent.

Usually, the transducer is arranged to determine its position and/or orientation with respect to at least two degrees of freedom relative to the environment. This is the case for example when the position of a creature or a thing is to be determined with respect to two position parameters. In the example illustrated in FIG. 1, the position of the person 3 is suitably determined with respect to at least two position parameters for recording the position of the person 3 in a certain horizontal plane, for example where on the floor the person 3 is present, and with respect to at least one orientation parameter for recording the direction of the person 3 in the environment, for example in which direction the head of the person 3 is directed or more closely how the head is turned about an axis perpendicular to the horizontal plane. In using the transducer 5, which determines more degrees of freedom, it is also possible to determine for example in which horizontal plane the person 3 is present as well. The current horizontal plane may vary, for example if the person 3 visits different floors or if the current person 3 bends down and straightens himself up, respectively. With knowledge about a further orientation parameter, how the head of the person is leaned, i.e. its rotation angle relative to said axis which is perpendicular to the horizontal plane, may also be determined. For obtaining complete information about the position and orientation of the person 3 (of the head) all position- and orientation parameters have to be determined.

For determining four degrees of freedom related to the room of the transducer 5, at least two signal sources 9 are required, and in most cases, at least three signal sources 9 are required. A use of only two signal sources 9 requires simple cases, for example by the fact that a favourable symmetry is present, or that certain position- and orientation information may be obtained in another way, for example through a model of the environment. In the case it is desired to determine all the six degrees of freedom, at least three, often four signal sources 9 are required. In most cases it is an advantage to use a great number of signal sources 9 independent of how many degrees of freedom that is desired to determine, since a great number of signal sources 9 secures that the smallest number of signal sources 9, which is required for transferring the signals to the transducer 5, always is obtained, even if some signal source or a few of the signal sources would be blocked out. These signal sources 9 may be placed in the environment for this special reason, but they may also be constituted by objects naturally occurring in the environment.

One type of transducer 5, which may be used in the devices for accomplishing the methods according to the invention, has been developed and introduced into the market by MEEQ AB, Hässlögatan 20, SE-721 31 Västerås, Sweden.

With the measuring method described in this application and in the Swedish patent No. 444530, 458427 and 506517 it is possible to perform measurements, i.e. to determine position and/or orientation with a great accuracy. In some cases with an accuracy in the magnitude of tenth of millimeters, or better, as regards position and tenth of a mrad, or better, as regards the orientation. Furthermore, by the fact that the incident directions of incident signals are recorded, and by the fact that the transducer knows its own position and orientation as well as the positions of the "desired"

signal sources, there is a possibility to sort out "false signals" originated from for example non-desired signal sources, alternative signal sources or reflected signal sources. By using more than the smallest number of signal sources required also disturbances in the form of obscured signal sources may be handled by the equipment without effecting the accurancy to any appreciable extent. Besides that the transducer records the incident directions of the signals for the different signal sources in the way mentioned above, thus, also reflected signals which incident differently on the transducer and originate from one and the same signal source, may be registered separately, and thereby undesired signals, also such as originate from one and the same signal source, may be dropped in the further evaluation of the signals.

When the invention is applied, it is suitably proceeded so that before the user utilises the equipment, the transducer 5 is brought to receive signals from at least two, preferably three or four, and usually from five or more signal sources 9, which define the coordinate system of the environment, by that the transducer 5 is moved throughout the room 1, until the transducer 5 has received sufficient information about the positions of the signal sources 9, i.e. about the coordinate system of the environment, which may be performed by hand by a person 3 or another creature 3 or by means of a vehicle, a freely movable robot or the like. If, in addition, it is required that during the subsequent use, the absolute scale of length shall be known, the measuring of the signal sources 9 is performed while simultaneously using a measuring standard, for example by placing an object with well known dimensions as a reference gage in the environment during the measuring procedure.

The transducer 5 may be a two-dimensional transducer of the kind which is described in the Swedish Patent No. 444530. Thus, the transducer may be an optical instrument, which works with "optical signal", which in this application refers to signals which are constituted by, or utilised, optical radiation within as well as outside the band of visible wavelengths. The wavelength range, which is preferably intended, is in the interval 10–15000 nm. Suitably, the wavelength range 200–1600 nm may be applied, but it should be emphasised that the invention is not in any way restricted to this wavelength interval. A number of signal sources 9, for example in the form of light emitting diodes, may be arranged at a distance from the transducer and from each other, so that in normal use of the transducer, always at least three, preferably four of the signal sources simultaneously may transfer signals to the transducer. The positions of the signal sources relative to each other are known, for example by measuring the positions of the sources in a coordinate system common to the sources, which measuring may be performed by means of the transducer. Concerning measuring of the positions of the signal sources in general reference is made to the Swedish Patent No. 506517.

Furthermore, the locating member 4 suitably comprises a means 10 for internal communication between the components: the transducer 5, the means 6 for transferring information from the locating member 4 to the creature 3 and the means 7 included in the locating member 4 for receiving information from the creature 3. The communication means 10 may have a local computer unit 11 and other standard components required for signal processing, signal transferring and storing of information. See also FIG. 3. Preferably, the device comprises also a means 12 for external communication between the locating member 4 and for example a central computer unit 13. The communication, both internally and externally, may be performed by signal transferring via wire or a wireless link. Although, the means 6 for transferring information from the locating member 4 to the creature 3 in the described example, is constituted by loudspeakers 6 located in the earphones 6, many other information transferring means may be used and certain of these will be described in connection to other embodiment examples. This is also true for the means 7 for receiving information from the creature 3, which means not necessarily needs to be a microphone 7.

The transducer 5 is in connection with a calculation unit via a communication channel, which calculation unit may be included in the computer unit 11 arranged in the locating member 4 or in the central computer unit 13. The communication channel may be constituted by a flexible cable as mentioned above, or—for allowing as large freedom of movement as possible to the operator—by a wireless link, for example an IR-link or a radio-link, for example "Bluetooth" technique from Ericsson Components AB in Kista, Sweden. Through this channel, information concerning how the different signals from the signal sources 9 incident on the transducer 5 is delivered to the calculation unit from the transducer 5.

The calculation unit continuously calculates position and orientation of the transducer 5. In one embodiment of the device, the transducer 5 is designed to receive transmitted signals from the signal sources 9 and record the relative incident directions of the signals received in relation to the transducer 5. This does not need to be performed by using optical signals, but may also be performed by using for example microwaves or acoustic waves and antenna arrays, so called phased arrays. The transducer may for example be a radar unit designed for transmitting radar waves and receiving radar echoes from signal sources in the environment. Based on the incident directions of the radar echoes, the calculation unit may then calculate the position and the orientation of the transducer, and thereby the position and the orientation of the object connected to the transducer.

Phased arrays for microwaves available on the market are provided by for example Ericsson Microwave AB, Mölndal, Sweden and by other suppliers of microwave equipment. Phased arrays for ultrasound are provided by for example the subsidiary company KrautKramer Ultrasonic Systems, Cologne, Germany, of the group of companies named AGFA.

In some cases the transducer has a surface designed to receive transmitted signals from the signal sources and to record the relative incident directions of the signals received in relation to the surface and/or the relative incident positions of the received signals on the surface. In this case, for example a lens may be used for depicting the environment on a surface. For example, a video camera of CCD-type and a wide-angle lens may be used as a transducer.

Figure 2:
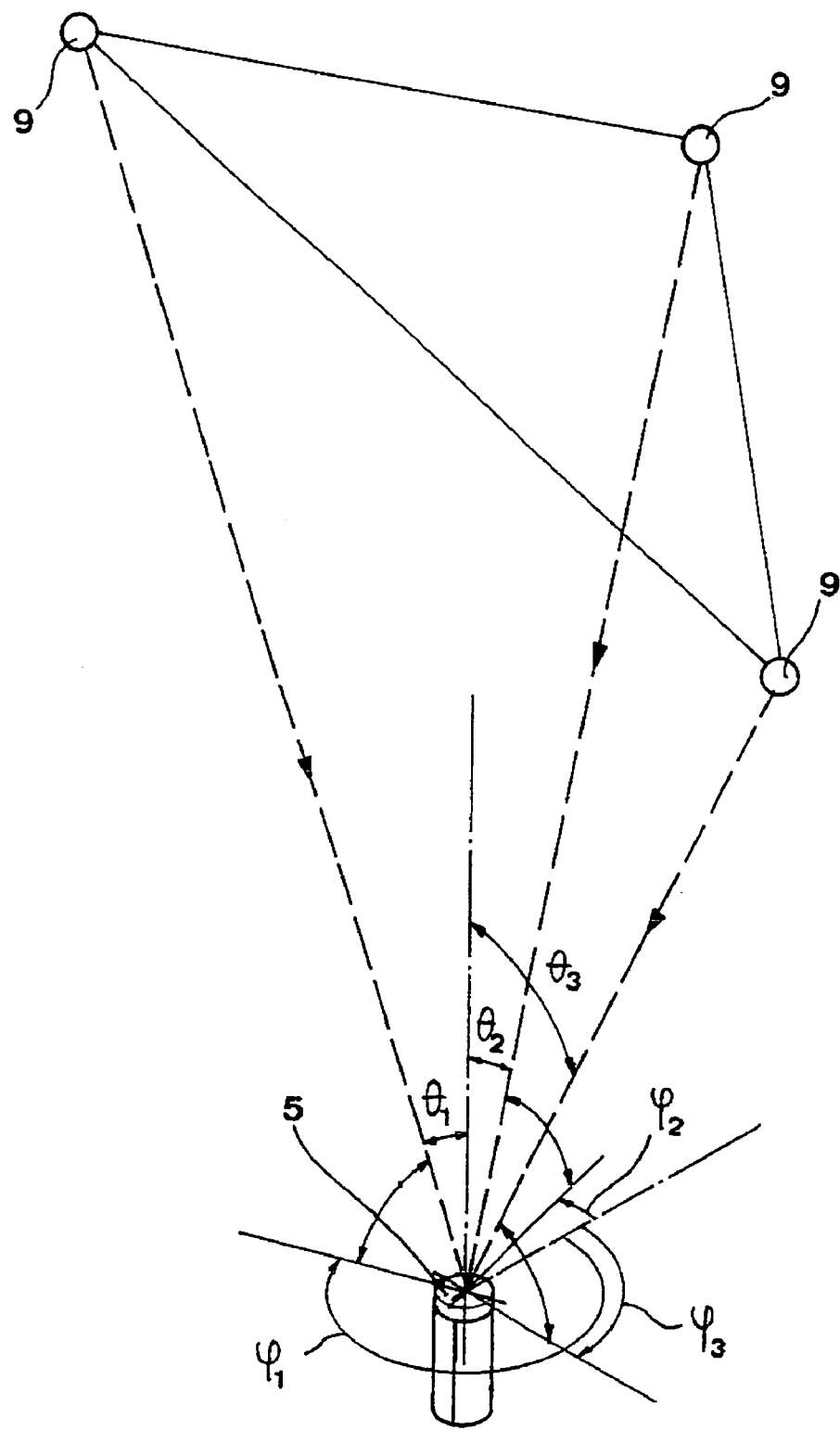
FIG. 2 is a schematic perspective view of a transducer according to the invention, and on the transducer incident signals occurring from signal sources in the environment.

In FIG. 2 it is schematically illustrated how signals from three signal sources 9 incident on the transducer 5 and how the incident angles of the received signals are related to each other. The incident direction for respective signal is defined by $\phi_i$ and $\theta_i$, where i=1, 2 or 3. The incident directions are then the basis for calculating the orientation- and position information required.

Figure 2A:
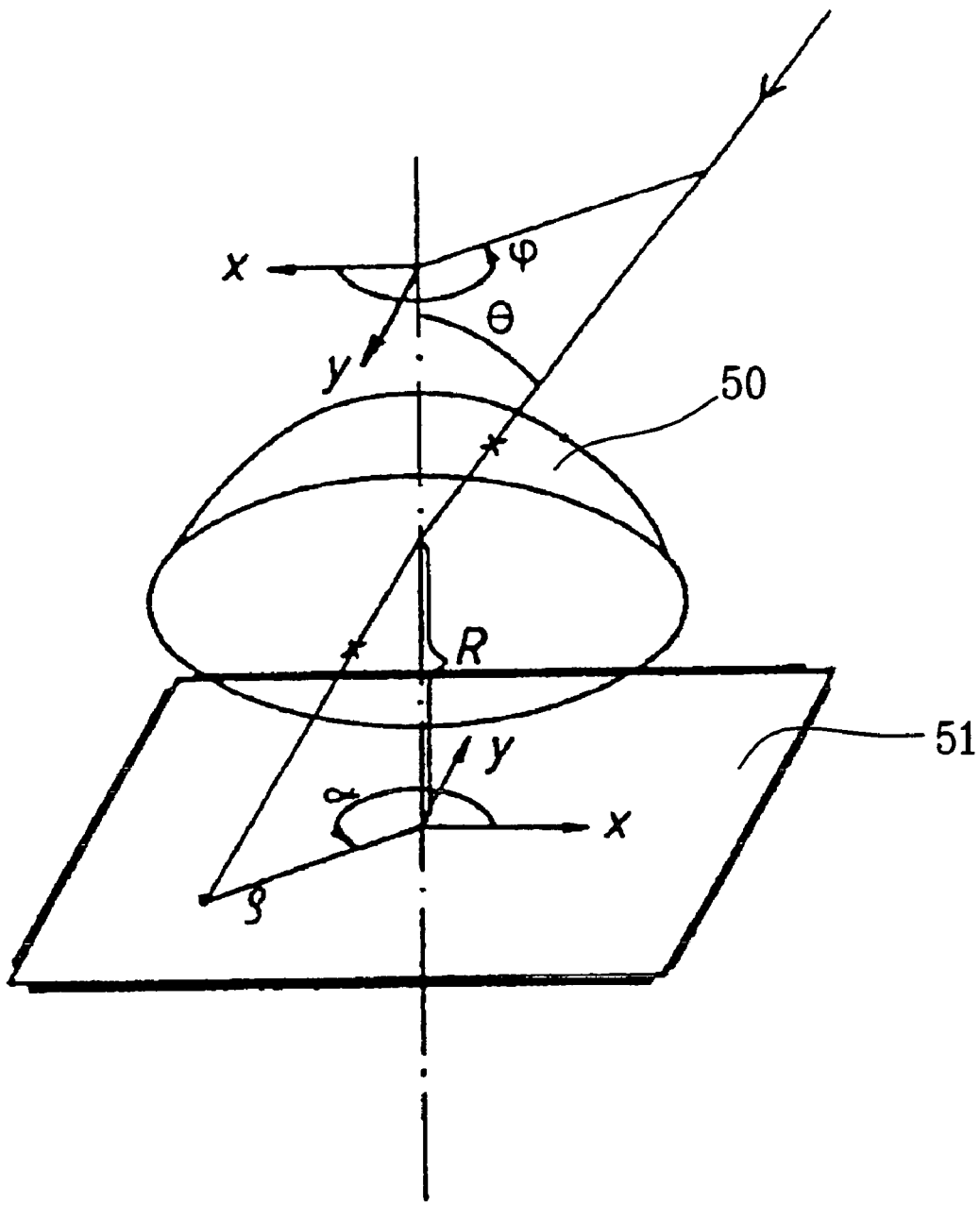
FIG. 2a is a perspective view of a transducer according to the invention comprising a wide-angle lens and a detector surface.

As an example, in FIG. 2a, a wide-angle lens 50 and a surface 51 for detecting the signals are illustrated. A signal from a signal source 9 in the environment which incidents on the wide-angle lens is depicted on the detector surface at a position which corresponds to the incident direction $\phi$, $\theta$ of the signal relative to the transducer 5. By detecting a unique position, i.e. its relative x, y-coordinates on the detector surface, the incident direction $\phi$, $\theta$ of the signal may be derived, i.e. the direction of the sight line from the transducer to the current signal source may be determined.

Briefly, the orientation- and the position calculation may in this case be performed by that three, in general four, signal sources 9 are selected, the directions relative to the transducer 5 of the sight lines from the transducer 5 to these signal sources 9 are determined, the position and orientation of the transducer 5 being obtained by using the directions of the sight lines, and the known positions of the signal sources 9 and geometrical relations between these quantities. The positions of the signal sources 9 relative to each other, are assumed to be known. Alternatively, the relative positions of the signal sources 9 may be known indirectly through that the position of each source is known in a coordinate system.

Advantageously, the signal receiving direction area which is constituted by a solid angle and which is formed by the collected amount of signal receiving directions from which the transducer is arranged to receive incident signals from said signal sources, of the transducer, is at least 0.2 steradians, otherwise it is difficult to maintain the performance concerning the determinations along the axis of the transducer, i.e. in the main direction of the transducer, so that this is in parity with the two other axes of the transducer. However, preferably this signal receiving direction area is at least 1 steradian, and the larger such area, the fewer number of signal sources are required in the environment to obtain a certain accuracy in the determination of the orientation and the position of the transducer relative to the environment. The more objects which move in the environment, and the more complicated geometry of the environment due to for example protruding boxes, oblique corners and other things that obstruct, the larger said signal receiving direction area should be, and in a workshop with a lot of movable parts it may be advantageous to have a signal receiving direction area exceeding 4 steradians, and still possibly more than 100 signal sources may be needed in the environment for attaining a reliable determination of the orientation- and position information for the transducer. In that case, it is also preferred that the signal receiving direction area is topologically connected, even if this is not any definite necessity.

Said signal receiving direction area may have any shape and spreading over the imagined solid angle sphere. According to a preferred embodiment of the invention, the signal receiving direction area of the transducer is topologically connected, which however includes that it could have enclosed direction areas without signal receiving capability. The signal receiving direction area is independent of external factors and relates only to the receiving directions of the transducer. It is not affected by limitations in the form of external blockage of direction areas or any partial absence of signal sources.

It is preferred that the signal sources are well spread out within the signal receiving direction area of the transducer, since this improves the probability that an arising disturbance, such as obscuring of some part of the environment through persons, fork lifters, robots or similar, does not prevent achieving of correct information, even if the number of signal sources in the environment are kept on a proportionately low level. However, it is really the design of the device according to the invention, especially with a broad signal receiving direction area, that makes such a well spreading not as important as in previous known devices of this type.

About the signal receiving direction area the following may be added:

A signal receiving direction area comprising less than 0.2 steradians is for natural reasons difficult to use in practice, since in such a case a small number of objects blocking in the environment may easily disturb the transducer so it does not work. In addition, in the case of such small signal receiving direction areas the number of required signal sources in the environment becomes impracticably large and it is that which in practice restricts the user. In addition, with such small, particularly if they are connected to each other, signal receiving direction areas, it will be difficult to maintain the same high measuring accuracy of positions in all position measuring directions.

Preferably, the signal receiving direction area should exceed 1 steradian, so that the number of required signal sources becomes reasonably large and so that a fairly uniform measuring accuracy of positions then may be obtained.

If the environment is geometrically complex, with for example many and possibly movable objects, reflecting/mirroring surfaces and/or transducer positions in the vicinity of big objects without signal sources, where a typical such an environment may be a film studio in which many persons, cameras, props, side-scenes, mirrors and vehicles are present at the same time, the signal receiving direction area should exceed 2 steradians. A further reason for a larger signal receiving direction area is that the transducer shall not have a restricted working range as regards firstly orientations because of large hidden sectors without signal sources. Particularly, in complex environments where it occur large objects blocking signal sources and the number of signal sources is limited, also signal receiving direction areas, which exceed 4 steradians, are desired.

The distribution of signal sources over the working range may preferably be adapted to the requirements of measuring accuracy in different parts of the environment and to the nature of the environment. This considerably facilitates the possibility to use signal sources naturally occurring in the environment. The need of the number of signal sources certainly depends on also the signal receiving direction area of the transducer, in accordance with the above mentioned, since the smallest number of signal sources recorded by the transducer in the normal case must be equal to or exceed 4. An increased number of signal sources give, however, both higher accuracy and improved durability against further disturbances.

The construction of a transducer and the construction of the corresponding calculating circuits and the function thereof are as mentioned before more closely described in the above mentioned Swedish Patent No. 444530.

The signal sources 9 may be active signal emitting sources, such as light emitting diodes or the like, the light of which may possibly be pulsated or modulated, or passive signal sources 9 such as reflecting markers made of for example reflecting tape. The markers may be plane figures or—to show the same shape independent of the viewing direction—be constituted by reflecting spheres. Furthermore, the markers may have different shapes in relation to each other to make it easy for the calculation unit and the signal processing circuits thereof to identify and keep apart different markers and alternatively, with the same purpose, markers with the same shape but with different sizes and/or "colour" may be used, the colour term including also not visible parts of the electromagnetic spectra. In the use of passive reflecting signal sources 9, the device may include means for transmitting of signals intended to be reflected by the reflecting markers. The transmitting means, which in such a case suitably are arranged in connection to the transducer 5, may transmit infrared light for instance, preferably pulsated or modulated with a certain frequency to be able to separate the current signals from interfering light sources, for instance.

In an alternative embodiment no specially arranged signal sources are required, but as signal sources are used suitable details already present in the environment. Examples of suitable details are corners, holes and similar, which have a characteristic appearance and well defined and known positions. When the device is started these details are pointed out and identified in a suitably way, and their positions are determined and stored, for example through downloading from a CAD-system, or alternatively they are measured by the transducer. The details used as signal sources may be illuminated only from regular lights in the room, but certainly special light sources may be arranged to give the illumination the desired intensity or character if required. Certainly, at least some of the signal sources may be constituted by specially arranged markers, for example, by portions, patterns or figures of light tape placed on a dark background. In the Swedish patent number 458 427 it is closer described how the position and orientation of a transducer of this type may be calculated, as well as the construction and the function of an equipment for performing this calculation.

A certain set of defined signal sources 9 included in an environment may be said to constitute a certain reference system in which the locating member 4 including the transducer 5 works. When a creature 3, provided with the locating member 4, enters such a reference system for cooperating with the signal sources 9, this is referred to as the locating member 4 approaches to the reference system and thereby a particular reference coordinate system. In approaching the system, there is different ways to obtain the information about the reference system required for the calculating unit. Suppose that a reference system has an extension corresponding to, for example, a larger building, such as a machinery room, in which a service person will move and perform certain actions. Thus, throughout the machinery room there are a lot of signal sources defined. Furthermore, the machinery room may as usual be provided with a number of entrances at which it is possible to pass into and out of the machinery room. If the service person connected to the locating member intends to go into the machinery room, to be able to approach the reference system in the general case, it is required that the calculating unit connected to the transducer receives information about where the service person enters the machinery room, i.e. the information about from which signal sources the transducer receives signals. This information may be received in a passive way or be obtained in an active way. Passive transferring of information may be performed by placing the signal sources, which are located for example at the entrance, so that they form a unique "pattern" for the reference system. The calculating unit recognises the pattern and may determine which reference system which will be used, and the entrance through which the service person will pass, or has passed, into the machinery room. When information is transferred in an active way, a transmitter, either a separate transmitter or one of the signal sources, may be located at the current entrance and when the service person passes this transmitter, the required information about the reference system is transferred to the calculating unit by receiving transmitted signals from the transmitter.

There is also possible to utilise other information sources for obtaining information about, for example, the position and/or orientation of a creature relative to the current reference system. For example, outdoors a GPS may be used for determining the positions of the service person when he/she is on the way to the machinery room. At the entrance to the machinery room, the local reference system takes over the navigation. In this connection, the position determination by GPS may be used to assist the calculating unit with certain initial information, such as at which building, door, etc. the creature is present, in the transition to the local reference system.

In the local reference system, one or more sub-reference systems may be arranged. With the machinery room as an example, this may involve that some object in the machinery room, such as a particular machine, has its own reference system. The reason for that may be for example that for different positions and/or applications, different characteristics of the reference system are required. For example, the sub-reference system may be able to be rearranged or movably arranged relative to a superior system. Thus, in different local reference systems or sub-reference systems, the number of signal sources, the locations of the signal sources, the type and function (active, passive, set out etc.) of the signal sources, may be varied to satisfy the current need. When moving inside the machinery room, possibly a relatively simple reference system is sufficient, whereas possibly a more advanced reference system around the machine at which the service person will perform inspection, adjustment, repair or the like, is required.

Figure 3:
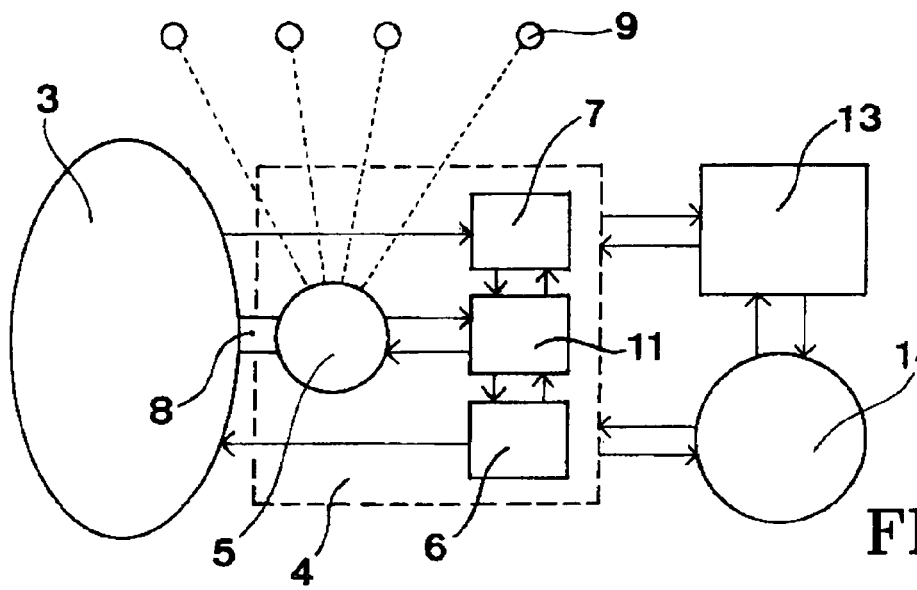
FIG. 3 is a block diagram of a device according to the invention and examples of communication lines between components possibly included in the device.

In FIG. 3 a block diagram, from which the different components and the corresponding communication lines of one embodiment of the invention appear, is illustrated. The locating member 4, including the transducer 5, the means 7 for transferring information from the creature 3 to the locating member 4, the means 6 for transferring information from the locating member 4 to the creature 3, and the local computer unit 11, may communicate with the external central computer unit 13. Furthermore, it appears that the transducer 5 obtains information required for the position and orientation determination from signal sources 9 in the environment. The creature 3 is mechanically connected to the transducer 5. The computer unit 11 receives information from the creature 3 via the information receiving means 7, for example a microphone or a inputting unit, such as a key set, and transfers information via the information communicating means 6, for example a loudspeaker or a display. Certainly, it is also possible to arrange the information transferring means in the form of one unit, such as a combined communicating and inputting unit. In FIG. 3, the fact that the locating member 4, as well as the central computer unit 13, may be connected with other objects 14 in the environment for transferring signals, is also illustrated. Furthermore, it is of course possible that one or more further objects are included in the locating member 4.

The use of the invention for determining the position and/or orientation of a creature 3, applied on the embodiment described with reference to FIG. 1 comprises that the position and/or orientation of the visitor 3 relative to the environment, is determined by connecting the person 3 to the locating member 4 including a transducer 5 so that the relative positions and/or orientations of the person 3 and the transducer 5 are arranged to be within a limited interval, the transducer 5 determining its position and/or orientation relative to the environment by receiving incident signals from signal sources 9 in the environment, and that the position and/or orientation of the creature 3 is determined by means of the position and/or orientation determined for the transducer 5. This is repeated continuously when the person 3 moves relative to the environment. The determination of position and/or orientation is always performed relative to the environment, but such as previously described, in some cases the environment may be constituted by the signal sources 9 only, and consequently, in such a case it is primarily the position and/or the orientation of the creature 3 relative to the previous position and/or orientation of the creature which primarily is determined.

In the embodiment example illustrated in FIG. 1, where a human being visits a museum, the invention may be utilised in a way so that at the visit, the person 3 may receive information about different pictures 2, which are looked at by the person. By the fact that the transducer 5 continuously may determine the position and orientation of the person 3 in the room 1, the (central) computer unit 11, 13 may receive information about when the person 3 looks at a certain picture 2 and in accordance with this information transmit for example a sound message to the observer which contains information about the artist, origin, painting technique, etc., of the picture 2. When works of art which give different experiences depending on the viewing direction are observed, the transferring of information, for example in the form of music or other sounds, may be adapted depending on the current viewing direction, to reinforce these characteristics of the piece of art. Furthermore, visitor 3 may receive information about how he/she should move relative to the environment to get to a position and/or orientation relative to the current object, which position and/or orientation leads to for example that a particular experience is attained.

The invention may be used in a similar way also for a guard which is assigned for a task of checking the building and see to that all pictures are present in their right positions or for a service person which are going to do for example technical installations. For this purpose, the guard does not need to know if there should be a picture in a certain position or not. It is sufficient that the guard follows given instructions and indirectly or in an active way, reports what he/she observes in certain given positions and viewing directions, and thereby someone/something which obtains information from the (central) computer unit may evaluate the information and decide if everything is in due order. When the guard moves, the movement thereof may be directed on the basis of or by means of the position and/or orientation information. For example, an operator at the central computer unit may give instructions continuously to the guard how he/she shall move or look during movement along the path the guard has to walk. These instructions may also be pre-recorded in the case an unmanned a central computer unit is used. At the same time as it is possible to check or effect the status of an environment by means of the invention, for example, switch-on/switch-off light when the guard passes a certain position, of course, it is also possible to check that the guard follows his instructions as regards paths of movement and the actions which have to be performed. In this connection, the positions and/or orientations determined for the guard may be recorded for mapping the movement of the guard relative to the environment, and/or relative to his previous position and/or orientation. Preferably, in this case abstract stations are used.

The invention may also be utilised by an artist or a museum superintendent for obtaining information about the activity of the visitors in the building and/or for designing suitable guiding routines for the visitors. Thus, it is possible to programme the computer unit/computer units 11, 13, so that a visitor 3 continuously is given relevant information based on the position and/or orientation of the visitor 3 and/or the desires of the visitor 3. When creating such a visitor routine, the artist himself may move in the current environment while utilising the equipment according to the invention and when he/she is present in particular positions and/or orientations, he/she may for example record an announcer text that a visitor 3 then may have played in the earphones 6 when the visitor, within certain given tolerances, is present in the corresponding position and/or orientation. There is also a possibility to store information about which pictures 2, which have been looked on, and to which extent, from which viewing directions and distances, etc. This information may be used in different ways, for example by art-dealers for determining which object that are popular and how the position of the object relative to the room effects the experiences, etc., of the visitor.

Particularly, it should be emphasised that the example regarding a museum illustrated in FIG. 1 is only to be regarded as just an example and that several equivalent applications of the invention are found within a number of different fields. For example, the invention could be used in different shops and shopping centres. Instead of pictures, for example articles and/or signboards are then objects which firstly are of interest to a visitor to study. In this connection, a customer could receive continuos information about different articles when he/she is present in a particular position and/or looks in a certain direction and information about suitable paths of movement to find the desired articles. The shopkeeper has in the same way as the museum superintendent also a possibility to evaluate how a customer has been moved and looked at the different articles and to which extent so has occurred to be able to optimise the design of the shop on the basis thereof with the purpose of increasing the sale and/or satisfy different desires of the customers. Furthermore, in a similar way as in the case of the museum, different visitor routines may be pre-programmed, and/or created on-line, in accordance with the desires of the shopkeeper/visitor. An alternative to headset is that the transducer in this case is arranged on a shopping trolley and that the customer is mechanically connected to the transducer by the fact that he/she quite simply holds the shopping trolley.

Figure 4:
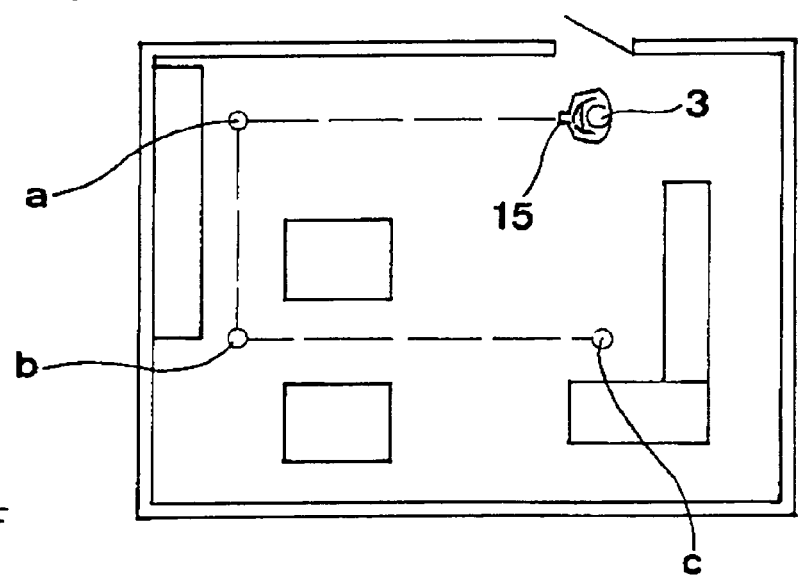
FIG. 4 is a view from above illustrating an exhibition hall and a visitor thereof, FIGS. 5a, b and c are illustrations of possible appearances of a display for transferring information carried by the visitor of the exhibition hall in FIG. 4.
Figure 5A:
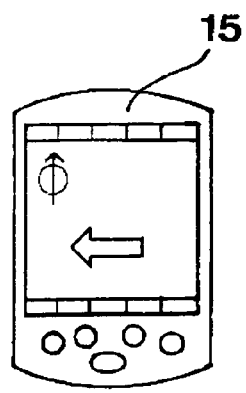
Figure 5B:
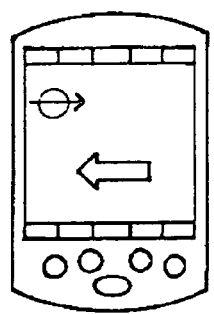
Figure 5C:
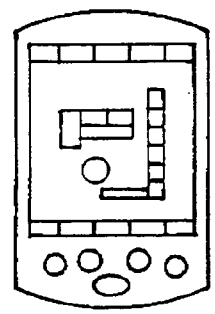

A further variant of this application of the invention is illustrated in FIGS. 4 and 5. In FIG. 4, an environment in the shape of an exhibition hall is illustrated. In this embodiment, the visitor 3 of the exhibition is provided with substantially the same equipment as in the example according to FIG. 1, but in this case the locating member 4 comprises also a representation and/or inputting unit 15, which may be for example a portable display designed to communicate with the other equipment. The visitor 3 of the exhibition may have information via the display 15 about how he/she should move, and/or communicate desires himself/herself, such as how he/she desires to move, to take part of what is illustrated in the exhibition hall in the best way, to find a lavatory or the like. In FIGS. 5a, 5b and 5c, an example of what could be displayed on the display when the visitor 3 of the exhibition is present at the points denoted with A–C in FIG. 4 is illustrated. On the display, several things may be displayed, such as which direction is pointing to the north, which direction the visitor 3 should choose to follow a certain route and/or reach a certain goal, or information of another kind to attract the visitors 3 attention or inform he/she and/or supply commercial advertising.

Figure 6:
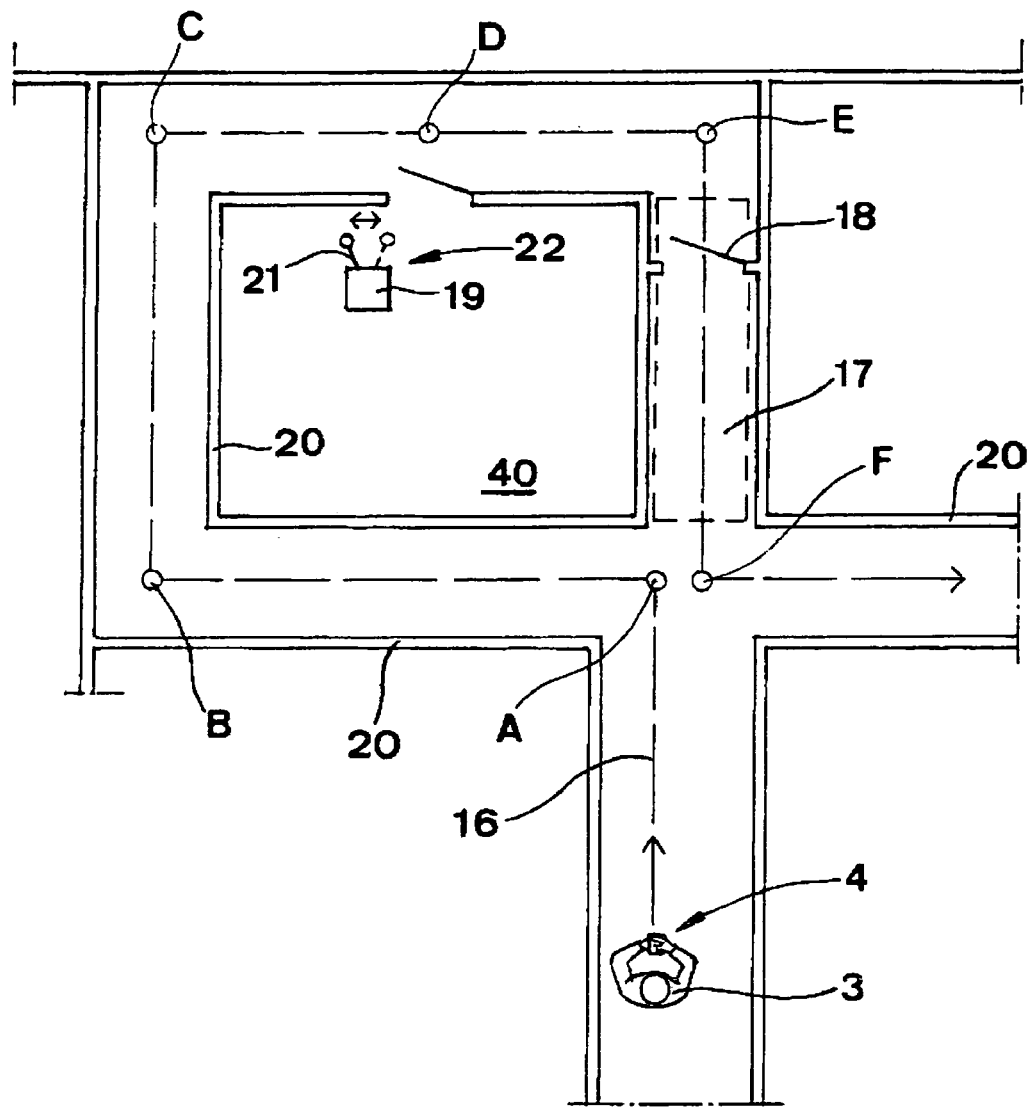
FIG. 6 is a view from above illustrating a path to be walked by a guard in a building and a guard.
Figure 7:
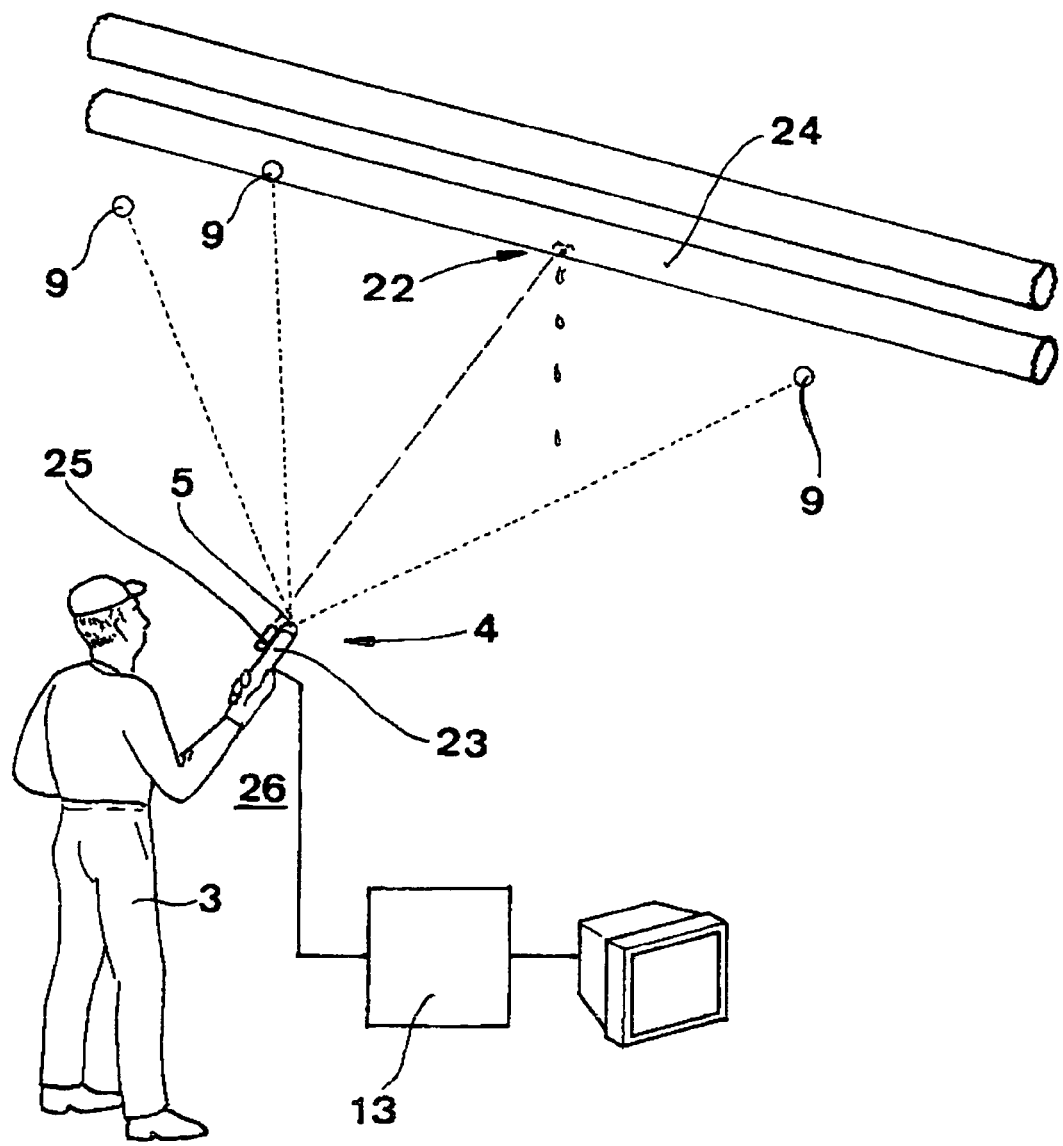
FIG. 7 is a perspective view of an environment in which a person locates a leakage of a pipe.
Figure 8:
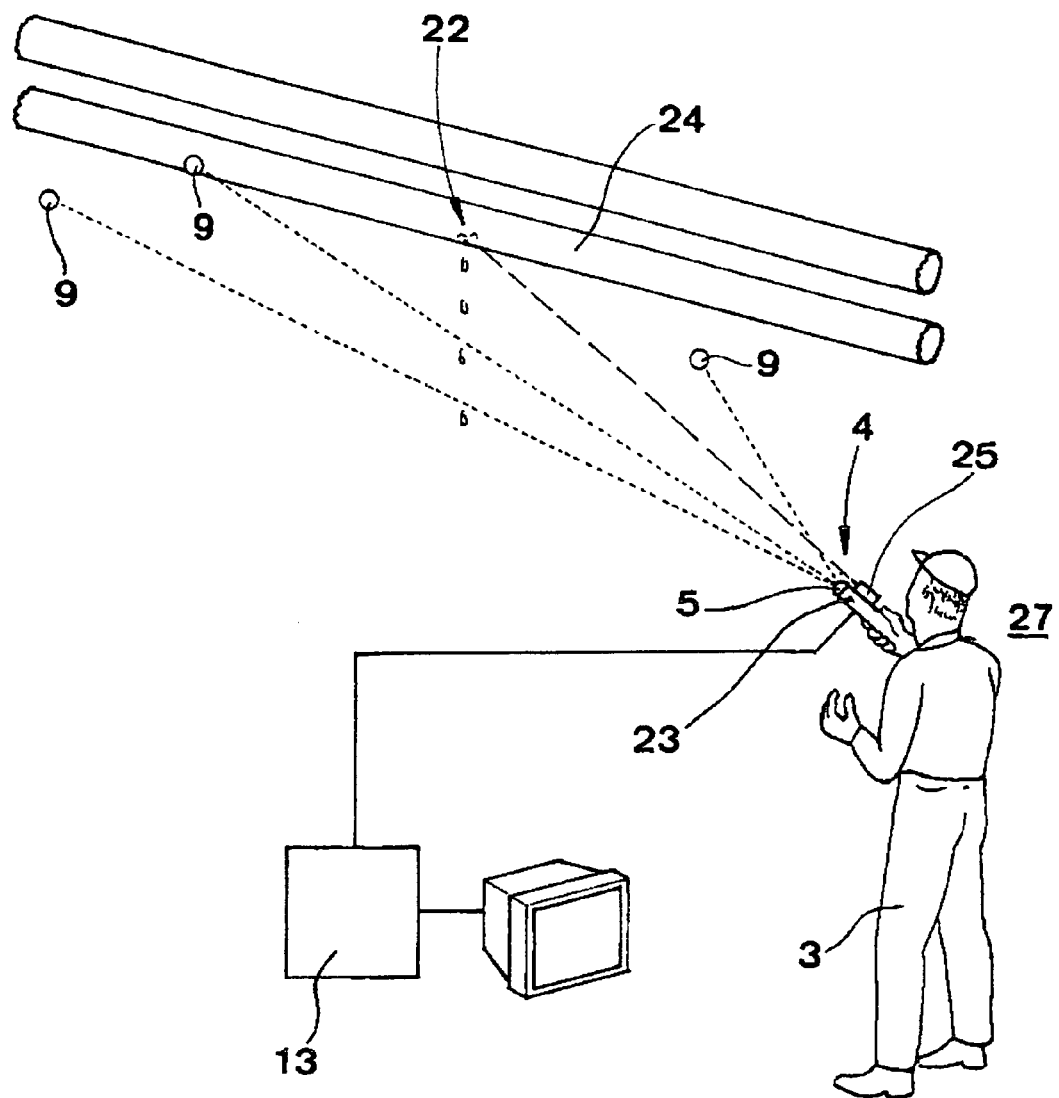
FIG. 8 is a view according to FIG. 7 in which the person has moved to another position relative to the environment.

In FIG. 6 a guard 3 on his guard path 16 is illustrated and FIGS. 7 and 8 illustrate how a guard 3 or a service person 3 identifies and reports a damage in a construction, more precisely, in the embodiment example the matter is a leakage of a pipe.

The case with the guard is in many ways analogous to the case of the museum/store, which is illustrated in FIG. 1. An important difference regarding how the equipment is used is however that in the previous example, the (central) computer unit 11, 13 suitably works as a "slave" and the visitor/customer 3 has a "master". In the guard case on the contrary, the conditions are the opposite, i.e. the guard 3 is "slave" and the (central) computer unit 11, 13 is the "master". The terms master and slave are used to indicate who or what is in control, which means for example that the guard 3, which is slave, is controlled by the (central) computer unit 11, 13, to go to a certain position for instance, whereas the visitor 3, which is master, freely chooses his path 16 of movement assisted by the (central) computer unit 11, 13 and to the extent desired controls which information he/she will receive from the computer unit/units.

In the guard case the (central) computer unit 11, 13 may be used to generate a guard path 16 with or without intervention by the guard 3. The guard 3 does not need to receive any prior information about the current guard path 16 or what will happen along the path. In this connection, the guard 3 is guided in the same way as, for example, a visitor 3 in previously described embodiments, towards a given goal, but the goal is predetermined by the (central) computer unit 11, 13, or is determined thereby and/or by an operator of the (central) computer unit 11, 13 and thus, not by the guard 3 himself. It can be arranged, for example, so that two patrolling guards are met without that the guards are informed thereof in advance. Furthermore, other guard duties may be introduced, such as that the guard when passing an object in the environment, for example a machine, has to take a special action to document the status of this object.

For the sake of clarity, in the example illustrated in FIG. 6, a dashed line and arrows illustrate the path 16 of movement of the guard 3. In addition, some critical points along the guard path 16 are denoted A–F. The guard 3 is intended to receive information via the locating member 4 about how he/she shall move and which actions that have to be performed. For this purpose, besides the previous mentioned means for transferring information between the creature 3 and the (central) computer unit 11, 13, the locating member 4 may also include a display unit portable by the guard 3. This means that the commands to the guard 3 along the guard path 16 could be transferred visually and/or auditorially and could have the following meaning: at points A and F; turn to left 90°, at points B, C and E; turn to right 90°.

If the guard 3 in violation of the present instructions, for example at the point A, instead would go to the right, new information may be transferred from the (central) computer unit 11, 13 to the guard 3 to correct the violation. In that connection, the guard 3 may receive information about to return to the assigned route. It is also possible to allow or deny the guard 3 authorisation. If the guard 3 in violation of the present instructions, for example at the point A, instead would go straight forward into the area 17 marked with dashed lines, information with the meaning that in this area it is forbidden to be may be transferred from the (central) computer unit 11, 13, to the guard 3 and/or signals that for example a door 18 shall be locked to prevent from passing may be sent from the (central) computer unit 11, 13 to a receiver in the environment for controlling the door lock.

In an arbitrary place and at an optional moment, the guard 3 may be requested to place himself in a certain position and/or orientation and/or to perform a certain action. This may be performed for example to accomplish a method for determining if the position and/or orientation of a phenomenon 22 relative to an environment corresponds to a reference. The method comprises that a creature, in this case the guard 3, such as previously described, is connected to a locating member 4 including a transducer 5, so that the relative positions and/or orientations of the creature 3 and the transducer 5 are arranged to be within a limited interval and that said reference is defined by the introduction of at least one condition regarding the position and/or orientation of the locating member 4 relative to the environment, and that the position and/or orientation of the locating member 4 relative to the environment, is determined by means of the transducer 5 by receiving incident signals from signal sources 9 in the environment, and that the position and/or orientation information determined for the locating member 4 is compared with the reference, so that at least one possibly occurring state in which said at least one condition is fulfilled may be recorded. The locating member 4 including the transducer 5 may, such as previously described, be such a member which is brought by the creature 3 or a locating member including a transducer, which member the creature temporarily is connected to at the current position. In the example illustrated in FIG. 6, the guard 3, when he/she is present at the point D, could be requested to place himself in a certain position and/or orientation and possibly be requested to take some further action in connection therewith, for example to go into a room 40 through the door located at the point D and by means of the transducer 5 determine that a switch 19 is in a switched-off or switched-on position, and in that way obtain permission to the marked area 17 and/or to cause that the door 18 at the point E is locked up, so that he/she may continue his guard path 16 to the point F.

Thus, in this embodiment, the invention includes said at least one reference defined by the introduction of at least one condition regarding the position and/or orientation of the transducer 5 relative to the environment, but also other conditions, such as a certain point of time, a voice test, etc., may be added. The introduction of the references according to the invention may be used as abstract stations which for example a guard is requested to visit, which gives a great flexibility in the arrangement of for example guard paths. Although, walls 20 which form corridors in which the guard 3 moves are illustrated in FIG. 6, it is also possible to create "corridors", "rooms", or the like, which are abstract and defined by certain position- and/or orientation coordinates by applying a specially designed authorisation. When applying such abstract environments, a person may move freely within a given zone, such as along a passage route in a workshop, but if the person turns off from the zone, an alarm is started and/or the person receives instructions via the locating unit. Zones, which are allowed and not allowed, may be created, changed or removed in an easy way all according to the present need, and may be different for different creatures.

With reference to previous described embodiments of the invention, it may be mentioned that another application of abstract station is that a person, for example a customer utilising the invention at a visit in a shop, receives a bonus and/or a reduction of the price if he/she visits certain abstract stations. At the abstract stations, for example an article may be exposed, and hereby a shopkeeper may increase the exposure to commercial in exchange for that the customer receives a certain reward.

In some cases said at least one condition is defined by the position and/or extension of an object 21 occurring in the environment. To secure that the guard 3 easily and rationally will be able to place the locating member 4, i.e. the transducer 5, in accordance with the reference, the locating member 4 and/or the reference object may in some cases be designed to enable the locating member 4 and the object 21 to engage each other for fixing the locating member 4 or a part thereof, and thereby the transducer 5, relative to the object 21, so that the transducer 5 fulfils said at least one condition. This may be applied to determine, by means of the transducer, that for example a voltage breaker is in a position which means that an area which otherwise is applied voltage, is disconnected, so that a service person may pass the area or perform work in the area, and after that the service person has left the area, to determine in a corresponding way that the breaker is in another position which means that the area is applied voltage.

In a similar way as in the examples of the museum and the shop, special guard paths may be established and if the required signal sources are present in the environment, a representative of those providing the guard service and a representative of the buyer thereof, may move in the current environment while bringing one or more locating members to together define and determine a guard path in accordance with the desires of the customer. In this connection, there is possible to design a certain guard service in situ and thus make an agreement about which actions that shall be included in the guard undertakings. For example, abstract stations and authorisations may be defined, routes and viewing directions, etc., for the guard 3 may be determined.

FIGS. 7 and 8 illustrate how a phenomenon 22 of an environment is located. This application of the invention comprises that a creature 3 is connected to a locating member 4 including a transducer 5 connected to a component 23 intended for pointing out phenomenon 22 in the environment, that the pointing component 23 is directed by the creature 3 towards the phenomenon 22 from at least one pointing position 26, the transducer 5 determining its position and/or orientation by receiving incident signals from signal sources 9 in the environment and thereby determining the position and/or orientation of the pointing component 23 relative to the environment for said at least one pointing position, and that the position and/or orientation of the phenomenon 22 pointed out relative the environment is determined by means of the position and/or orientation determined for the pointing component 23. To accomplish this, the locating member 4 includes the pointing component 23 portable by the creature 3 and mechanically connected to the transducer 5, which component 23 is to be directed relative to phenomenon 22 in the environment. A service person 3 directs the pointing component 23 towards a leaking pipe 24. The pointing component 23 may include a means 25 for transmitting directive electromagnetic radiation, such as laserlight or the like. In this connection, the pointing component 23 may be directed towards the current phenomenon 22 with precision at the same time as the transducer 5 provides information about the position and/or orientation of the pointing component 23 relative to the environment. Then, to determine the position of phenomenon 22, in this case the position of the leakage 22 of a water pipe, relative to the environment, the method may be repeated for one or more other different positions of the pointing component 23. Suitably, the service person 3 confirms that such a pointing out action is desired to be recorded by verifying that the pointing component 23 is placed in a position in which a pointing out action shall be performed.

Verification may be performed in many different ways, for example by that the creature effects an activation component of the pointing component, such as a button or the like, or by talking in a microphone connected to the (central) computer unit 11, 13 or by keeping the pointing component still during a certain period of time, etc.

In FIG. 8, the person 3 is illustrated in another position 27 relative to the environment. By means of the information about the position and the orientation of the pointing component 23 for two different positions 26, 27 in which the pointing component 23 is directed towards the current phenomenon 22, the position of the current phenomenon 22 may be calculated. Alternatively, in combination with the position- and orientation determination performed by means of the transducer 5, other information may be used, such as one or more models of the environment. By using a model of the environment, in some cases, the position of the current phenomenon 22 may be determined by directing the pointing component 23 including the transducer 5 towards the phenomenon 22 from one position only.

The locating member 4 could also include a sensor to obtain information from the environment by recording or measuring one or more properties of the environment in one or more positions and/or directions at the same time as the position- and/or orientation determination is performed. With such a device, other phenomena including such which are not possible to indicate visually, may be located. For example, a radiation detector arranged in the pointing component would enable detecting and locating of a radioactive leakage. It is also possible to provide the locating member with a camera, such as a video camera, by arranging the camera on for example the pointing component, or on another suitable position, for example by that the creature quite simply carries the camera, with the purpose of obtaining further information by picture recording of the environment in connection to the position- and/or orientation determination.

Figure 9:
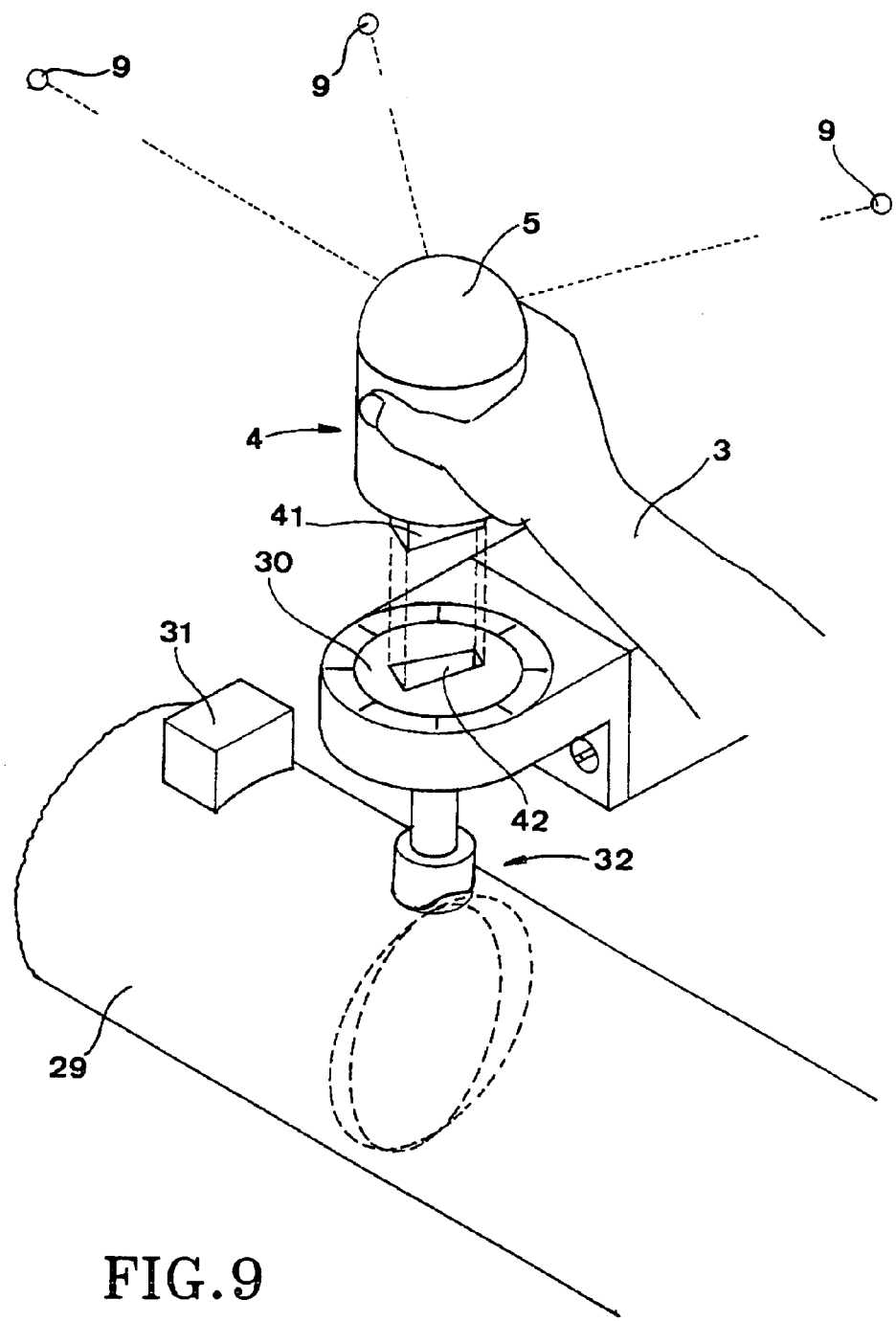
FIG. 9 is a perspective view of a pipe and a valve arranged thereon and a locating member to be applied on the handle of the valve.

With reference to FIG. 9 the invention is described in connection with the application of determining the position and/or orientation of an object 30 relative to an environment by means of a creature 3. The method comprises that the creature 3, for example a guard or a service person, is connected to a locating member 4 including a transducer 5, that the locating member 4 is put by the creature 3 into mechanical contact with the object 30, that the position and/or orientation of the locating member 4 relative to the environment is determined by means of the transducer 5 by receiving incident signals from signal sources 9 in the environment, and that the position and/or orientation of the object 30 is determined by means of the determined position and/or orientation of the locating member 4. In FIG. 9 a pipe 29 containing a flowing medium is illustrated. The pipe 29 is provided with a flow measurement equipment 31 and a valve 32 for regulating the flow of the medium. The valve 32 may be adjusted by means of a handle 30 and thereby the flow may be regulated. Thus, for different settings of the handle, different flows in the pipe are obtained. In this connection the invention has several applications. However, first of all, it should be emphasised that the embodiment illustrated in FIG. 9 is to be regarded only as an example and although the invention is illustrated by means of the valve 32 mentioned above, the invention may be applied in a similar way together with an arbitrary object 30. In this example, the handle 30 is designed for receiving one part of the locating member 4 including the transducer 5. The transducer 5 is connected to a creature 3, suitably a human being, for example by the fact that the person 3 holds a part of the locating member 4 in the hand.

Preferably, the locating member 4 and the reference object, i.e. the handle 30, are designed to engage each other for fixing the locating member 4 and thereby the transducer 5 relative to the object 30. This may be performed by that a wedge-shaped pin 41 is introduced into a corresponding wedge-shaped grove 42. In this way it is possible to determine, calibrate and/or adjust the position and/or orientation of the handle 30. For example, the service person 3 may determine that the handle 30 is present in the desired position and/or transfer information about the position and/or orientation of the handle 30 to the (central) computer unit 11, 13 by applying the locating member 4 at the handle 30. The information may be used to check the state of for example a technical process of any kind. Furthermore, it is possible to evaluate a technical function by study how this function is effected by different settings of the current object. In the example, the valve 32 could for example be calibrated by performing direct flow measurements by means of the flow measurement equipment 31 for different settings of the handle 30, which settings are determined by means of the position and/or orientation information produced by means of the transducer 5.

Figure 10:
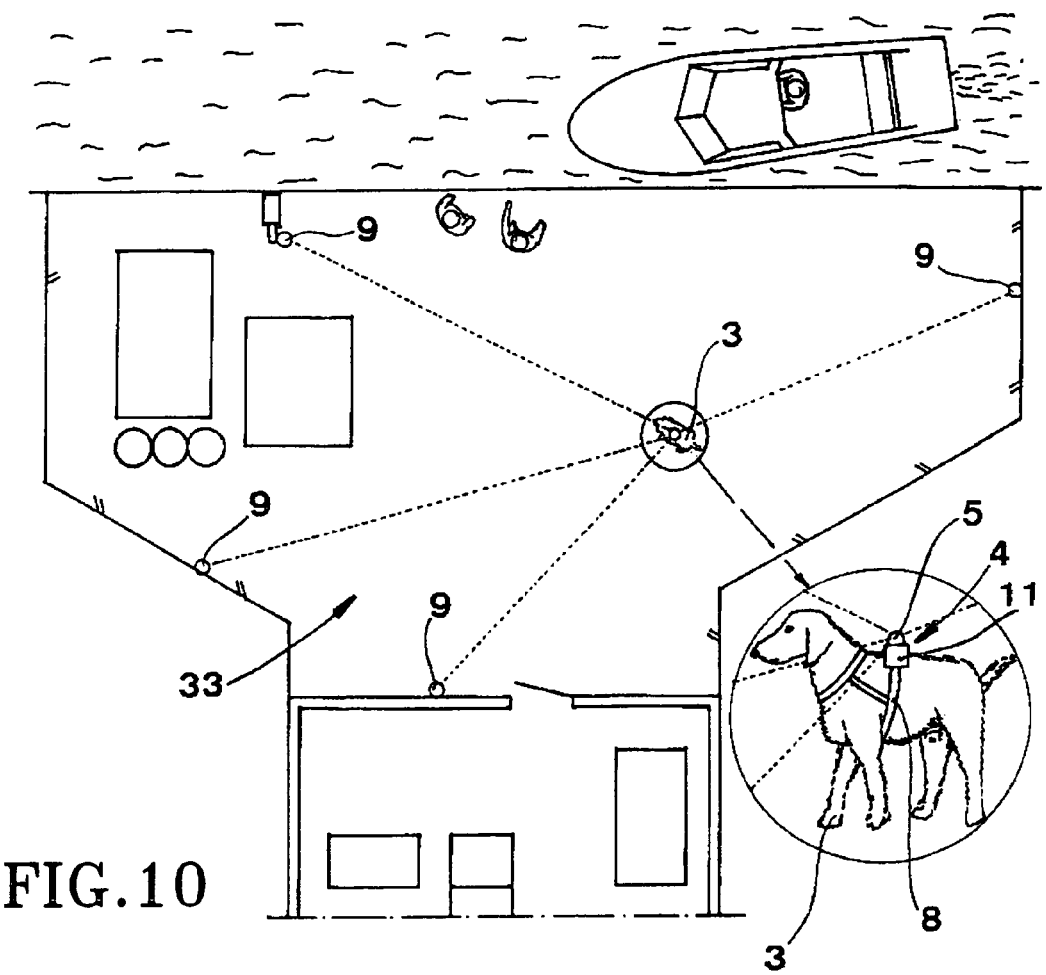
FIG. 10 is a view from above illustrating an industrial estate which is subject for searching by means of a dog.

Another application of the invention is searching and mapping an object, an area or a volume. In FIG. 10, an area 33 is schematically illustrated, which area may be for example a industrial estate close to a harbour, which is desired to be searched to investigate if drugs are present in the area. In this case, the creature 3 is suitably an educated sniffer dog 3 which is connected to the transducer 5 by means of a band 8 around the neck or the abdomen. Preferably, the locating member 4 also comprises a computer unit 11 and/or a locating member 4 is connected to a central computer unit. The transducer 5, such as previously described determines continuously its position and/or orientation by receiving incident signals from signal sources 9 in the environment, and by means of the position and/or orientation determined for the transducer 5 the position and/or orientation of the dog 3 may be determined. This makes it possible to map the movement of the creature 3 relative to the environment. Furthermore, it may be recorded at which moment the dog 3 has/had a certain position and/or orientation.

When the creature 3 moves relative to the environment, one or more properties of the environment may be recorded and mapped. In this case, it is possible to record if drugs are present at this location or not. The recording may be effected on the basis of the behaviour of the dog 3. For example, if the dog 3 moves in a normal way, probably there are no drugs, whereas if the dog 3 is found to move and/or to make a motion in a particular way at a certain location, drugs may be present. The dog 3 could also bark when the dog has found something special and by means of a microphone included in the locating member 4 and the other communication means already described, the barking of the dog could be transferred to the (central) computer unit 11. Certainly, the information could also be transferred in a opposite direction in the form of commands to the dog 3. The creature 3 may move in a non-predictable way while the position and/or orientation of the creature is determined continuously. However, it is also possible to train the dog 3 to move, or to make a motion, in a trained way and in that connection, the invention may be used such as described above, and to train the dog 3 to perform a certain motion and/or movement.

Another application in this connection is to document for research purposes how different animals move in different contexts. For example, a horse could be provided with one or more transducers arranged on the legs of the horse for mapping the movement pattern thereof.

In the embodiment example regarding the sniffer dog 3, the method may be performed with or without a person leading the dog. Dispensing with persons who lead the dog results in important reduction in costs. Furthermore, of course there are similar applications, such as searching for bombs in buildings.

Another application is directly or indirectly removal of mines by securing and recording mine-free areas. In areas where it occurs mines, particularly anti-personal mines, the invention may be used by that creatures are provided with locating members. The positions relative to the environment which positions human beings or animals provided with locating members have been present in, may be recorded while these people, cattles, etc., are moving in a normal way in the environment, i.e. in the same way as they should have done also in absence of the locating members. Hereby, mine-free positions may be recorded in an effective way for creating information about mine-free areas and trafficable roads. Certainly, it is also possible to more systematic investigate if mines are present in an area, for example by letting one or more dogs repeatedly enter upon the area where mines are thought to be present until sufficient position information is obtained to consider that the area is cleared from mines.

Figure 11:
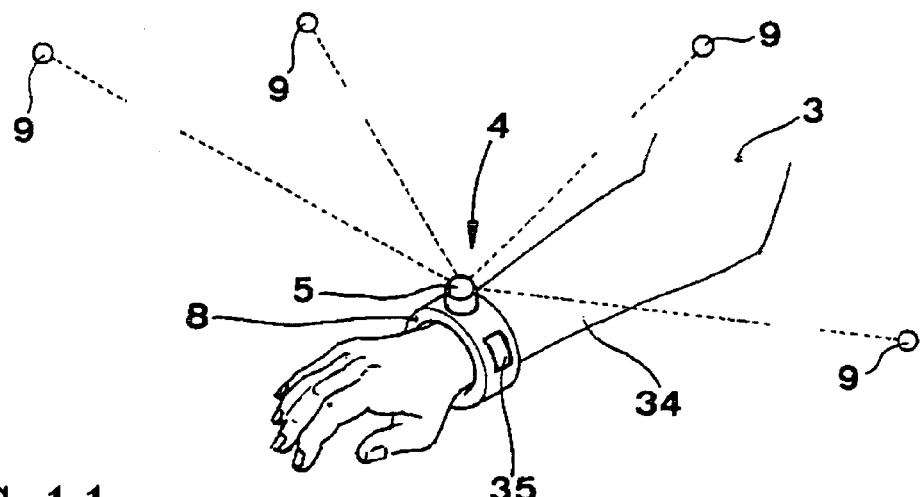
FIG. 11 is a view illustrating a bracelet applied on a person and intended to work as an electronic tag.

In FIG. 11 a locating member 4 including a connection means 8 in the shape of a bracelet arranged on an arm 34, to be used as an electronic tag, is illustrated. The locating member 4 is in connection with an alarm unit 35, which suitably may be included in the bracelet, for transferring signals between the locating member 4 and the alarm unit 35. However, the alarm unit 35 could be separately arranged in an arbitrary position in the environment. The alarm unit 35 is suitably arranged to emit a sound signal and/or signals to a (central) computer unit under certain conditions. These conditions may be for example that the transducer 5 has determined that the person 3 who carries the bracelet is present in a forbidden position and/or orientation, that the transducer 5 is not switched on, that the transducer 5 does not work as intended, that the connection between the locating member 4 and the alarm unit 35 is broken or that the alarm unit 35 has been removed from its intended position. Preferably, the alarm unit 35 is designed so that a special tool has to be used for removing the alarm unit from its position for example at the bracelet, so that such a removal performed without damaging the alarm unit 35, or another part of the device, may be performed only by a certificated person having access to said tool.

By connecting the person 3 to the locating member 4 and establishing a connection for communication between the locating member and the alarm unit 35, an efficient so called electronic tag with unique characteristics is obtained. From the locating member 4, information about the position and/or orientation of the person 3 may be transferred continuously, if so is desired, to an external supervision central, but this is not in any way necessary for carrying out the supervision. Transferring of position and/or orientation information to a supervision central may be performed at optional occasions, such as in case of an alert, an error function or if manipulation occurs, or any transmission at all has to take place. Thus, another great advantage of the invention is that it enables supervision without the need of transmitting signals from the locating member 4 to a receiver in the environment. The device according to the invention requires only that signals are transferred from the environment to the locating member 4, which signals do not contain any information about where the creature 3 is present, and hereby the carrier of the electronic tag is protected against non-certified bugging and tracking. This means that the risk that people who are a threat against the safety of the person 3 are able to track the person by bugging is considerably reduced or totally eliminated.

Furthermore, it should be mentioned that all transferring of signals described in this application, particularly between the creature 3 and the (central) computer unit 11, 13, certainly, may be coded and/or compressed by means of existing technique to prevent non-certified bugging and for attaining high speed transmission, respectively.

What is claimed is:

1. A method for determining at least two spatial degrees of freedom of a creature (3) relative to an environment, comprising the steps of:
    connecting a creature to a locating member (4) including a transducer (5),
    operating said transducer to determine at least two spatial degrees of freedom of the transducer relative to the environment by
    i) the transducer receiving incident optical signals from at least two signal sources (9) located in the environment and recording the relative incident positions of the received signals on a surface of the transducer,
    ii) based on the recorded relative positions of the received signals, calculating directions ($\phi_1, \theta_1; \phi_2, \theta_2; \phi_3, \theta_3;$) of sight lines extending between respective signal source and the transducer, with respect to at least two of said at least two signal sources, and
    iii) calculating said at least two spatial degrees of freedom of the transducer relative to the environment by using the directions of the sight lines,
    the method further comprising:
    determining said at least two spatial degrees of freedom of the creature from said at least two spatial degrees of freedom of the transducer, the creature and the locating member being mechanically connected relative to each other within a known limited spatial interval with respect to said at least two spatial degrees of freedom.

2. A method according to claim 1, wherein, when the creature (3) moves, said at least two spatial degrees of freedom of the creature are repeatedly determined by the transducer (5) repeatedly determining said at least two spatial degrees of freedom of the transducer.

3. A method according to claim 1, wherein, said at least two spatial degrees of freedom of the creature (3) are determined relative to preceding values of said at least two spatial degrees of freedom of the creature.

4. A method according to claim 3, characterized in that said at least two degrees of freedom determined for the creature (3) are recorded for mapping the relative movement of the creature.

5. A method according to claim 1, characterized in that said at least two spatial degrees of freedom determined for the creature (3) are recorded for mapping the movement of the creature relative to the environment.

6. A method according to claim 1, characterized in that when the creature (3) moves relative to the environment at least one property of the environment is at least one of recorded and mapped.

7. A method according to claim 1, characterized in that said determination of said at least two degrees of freedom of the creature (3) is performed while the creature moves in a non-predictable way.

8. A method according to claim 1, characterized in that said determination of said at least two degrees of freedom of the creature (3) is performed while the creature moves in a trained way.

9. A method according to claim 1, characterized in that when the creature (3) moves, the movement of the creature is directed by means of said at least two degrees of freedom determined for the creature.

10. A method according to claim 1, further comprising the step of:
    using a signal receiving direction area that constitutes a solid angle exceeding 0.2 steradianes (sr) and which solid angle is formed by the collected amount of signal receiving directions in which the transducer is arranged to receive incident signals from said signal sources (9).

11. A method according to claim 10, characterized in that the signal receiving direction area constitutes a solid angle that exceeds 1 steradian.

12. A method according to claim 10, characterized in that the signal receiving direction area constitutes a solid angle that exceeds 2 steradians.

13. A method according to claim 10, characterized in that the signal receiving direction area constitutes a solid angle that exceeds 4 steradians.

14. A method according to claim 10, further comprising using of said signal receiving direction area which is topologically connected.

15. A method according to claim 1, characterized in that occurences caused by at least one of the presence of the creature (3) and the actions of the creature are recorded.

16. A method according to claim 1, characterized in that information is transferred from the locating member (4) to the creature (3) via an information communicating means (6).

17. A method according to claim 16, characterized in that information about the viewing direction of the creature (3) is transferred.

18. A method according to claim 16, characterized in that information about the movement direction of the creature (3) is transferred.

19. A method according to any of claim 16, characterized in that information about the nature of the environment is transferred.

20. A method according to claim 16, characterized in that information about movement paths (16) is transferred.

21. A method according to claim 1, characterized in that information is transferred from the creature (3) to the locating member (4) via an information receiving means (7).

22. A method according to claim 1, characterized in that information from the locating member (4) is transferred to at least one central computer unit (13).

23. A method according to claim 22, characterized in that information is transferred to the creature (3) through an information transferring means arranged in the environment and controlled by said computer unit (11, 13).

24. A method according to claim 23, characterized in that information from said information transferring means is transferred to the creature (3) through a representation unit (15) of the locating member (4).

25. A method according to claim 1, characterized in that information from at least one central computer unit (13) is transferred to the locating member (4).

26. A method according to claim 1, characterized in that information from the transducer (5) is transferred to at least one computer unit (11) of the locating member (4).

27. A method according to claim 1, characterized in that information from at least one computer unit (11) of the locating member (4) is transferred to the transducer (5).

28. A method according to claim 1, characterized in that the nature of the environment is recorded by the creature (3) by means of a sensor.

29. A method according to claim 1, characterized in that said at least two spatial degrees of freedom of the transducer (5) are determined by recording the relative incident directions of the signals received by means of the transducer.

30. A method for determining at least two spatial degrees of freedom of a creature (3) relative to an environment, comprising the steps of:
- connecting the creature to a locating member (4) including a transducer (5),
- operating said transducer to determine at least two spatial degrees of freedom of the transducer relative to the environment by
  i) the transducer receiving incident signals from at least two signal sources (9) located in the environment by means of at least one phase-darray and recording the relative directions of the signals received,
  ii) based on the recorded relative directions of the received signals, calculating directions ($\phi_1$, $\theta_1$; $\phi_2$, $\theta_2$; $\phi_3$, $\theta_3$;) of sight lines extending between respective signal source and the transducer, with respect to at least two of said at least two signal sources, and
  iii) calculating said at least two spatial degrees of freedom of the transducer relative to the environment by using the directions of the sight lines,
the method further comprising:
- determining said at least two spatial degrees of freedom of the creature from said at least two spatial degrees of freedom of the transducer, the creature and the locating member being mechanically connected relative to each other within a known limited spatial interval with respect to said at least two spatial degrees of freedom.

31. A method according to claim 30, characterized in that for said signals microwaves are used.

32. A method according to claim 30, characterized in that for said signal acoustic waves are used.

33. A method according to claim 30, characterized in that that said at least two spatial degrees of freedom of the transducer (5) are determined by receiving incident optical signals from the signal sources (9) in the environment.

34. A method according to claim 30, wherein when the creature (3) moves said at least two spatial degrees of freedom of the creature are repeatedly determined by the transducer (5) repeatedly determining said at least two spatial degrees of freedom of the transducer.

35. A method according to claim 30, wherein said at least two spatial degrees of freedom of the creature (3) are determined relative to preceding values of said at least two spatial degrees of freedom of the creature.

36. A method according to claim 30, characterized in that said at least two spatial degrees of freedom determined for the creature (3) are recorded for mapping the movement of the creature relative to the environment.

37. A method according to claim 30, characterized in that when the creature (3) moves relative to the environment at least one property of the environment is recorded and/or mapped.

38. A method according to claim 30, characterized in that occurrences caused by the presence of the creature (3) and/or the actions thereof are recorded.

39. A method according to claim 30, characterized in that the nature of the environment is recorded by the creature (3) by means of a sensor.

40. A method for locating a phenomenon (22) in an environment, comprising the steps of:
- connecting a creature (3) to a locating member (4) including a transducer (5) mechanically connected to a component (23) intended for pointing out phenomena in the environment,
- directing the pointing component by the creature towards the phenomenon from at least one pointing position,
- operating the transducer to determine at least two spatial degrees of freedom of the transducer relative to the environment by
  i) the transducer receiving incident signals from at least two signal sources (9) located in the environment,
  ii) calculating directions ($\phi_1$, $\theta_1$; $\phi_2$, $\theta_2$; $\phi_3$, $\theta_3$;) of sight lines extending between respective signal source and the transducer, with respect to at least two of said at least two signal sources, and
  iii) calculating said at least two spatial degrees of freedom of the transducer relative to the environment by using the directions of the sight lines,
the method further comprising:
- determining at least two spatial degrees of freedom of the pointing component from said at least two spatial degrees of freedom of the transducer, the pointing component and the transducer being mechanically connected relative to each other within a known limited spatial interval with respect to said at least two spatial degrees of freedom, and
- determining at least one spatial degree of freedom of the pointed out phenomenon relative to the environment from said at least two spatial degrees of freedom of the pointing component.

41. A method according to claim 40, characterized in that the pointing component (23) is directed by the creature (3) towards the phenomenon (22) from two different pointing positions.

42. A method according to claim 40, characterized in that said at least one spatial degree of freedom of the pointed out phenomenon is determined by means of a model (28) of the environment.

43. A method for determining if at least two spatial degrees of freedom of a phenomenon (22) relative to an environment is in accordance with a reference, comprising the steps of:
- connecting a creature to a locating member (4) including a transducer (5),
- defining a reference by the introduction of at least one condition regarding at least two spatial degrees of freedom of the locating member relative to the environment,
- operating said transducer to determine at least two spatial degrees of freedom of the transducer relative to the environment by
  i) the transducer receiving incident signals from at least two signal sources located in the environment,
  ii) calculating directions ($\phi_1$, $\theta_1$; $\phi_2$, $\theta_2$; $\phi_3$, $\theta_3$;) of sight lines extending between respective signal source and the transducer, with respect to at least two of said at least two signal sources, and iii) calculating said at least two spatial degrees of freedom of the transducer relative to the environment by using the directions of the sight lines, the method further comprising:

determining said at least two spatial degrees of freedom of the locating member from said at least two spatial degrees of freedom of the transducer, the creature and the transducer being mechanically connected relative to each other within a known limited spatial interval with respect to said at least two spatial degrees of freedom, and comparing said at least two degrees of freedom determined for the locating member with the reference so that at least one possibly occurring state in which said at least one condition is fulfilled may be recorded.

44. A method according to claim 43, characterized in that the locating member (4) is put by the creature (3) into mechanical contact with an object (19, 30) in the environment for fixing the locating member or a part thereof and thereby the transducer (5) relative to the object so that said at least one condition is fulfilled.

45. A method according to claim 44, characterized in that the locating member (4) and the object (19, 30) are moved into engagement with each other so that said at least one condition is fulfilled.

46. A method according to claim 43, characterized in that states in which said at least one condition is fulfilled is recorded only when a further predefined measure is performed substantially at the same time by the creature (3).

47. A method for determining at least two spatial degrees of freedom of an object (30) relative to an environment by means of a creature (3), comprising the steps of:

connecting a creature to a locating member (4) including a transducer (5), putting the locating member into mechanical contact with the object by the creature, operating said transducer to determine at least two spatial degrees of freedom of the transducer relative to the environment by i) the transducer receiving incident signals from signal sources (9) located in the environment, ii) calculating directions ($\phi_a$, $\theta_1$; $\phi_2$, $\theta_2$; $\phi_3$, $\theta_3$;) of sight lines extending between respective signal source and the transducer, with respect to at least two of said at least two signal sources, iii) calculating said at least two spatial degrees of freedom of the transducer relative to the environment by using the directions of the sight lines, the method further comprising:

determining said at least two spatial degrees of freedom of the locating member from said at least two spatial degrees of freedom of the transducer, and determining at least two spatial degrees of freedom of the object from said at least two spatial degrees of freedom of the locating member.

48. A method according to claim 47, characterized in that said at least two spatial degrees of freedom of the object (30) is determined relative to preceding values of said at least two spatial degrees of freedom of the object.

49. A method according to claim 47, characterized in that the locating member (4) and the object (30) are moved into engagement with each other for fixing their relative values of said at least two spatial degrees of freedom.

* * * * *